United States Patent
Hu et al.

(10) Patent No.: US 10,708,911 B2
(45) Date of Patent: Jul. 7, 2020

(54) ELECTRONIC DEVICE AND WIRELESS COMMUNICATION METHOD IN WIRELESS COMMUNICATION SYSTEM

(71) Applicant: SONY CORPORATION, Tokyo (JP)

(72) Inventors: Bingshan Hu, Beijing (CN); Chen Sun, Beijing (CN)

(73) Assignee: SONY CORPORATON, Tokyo (JP)

( * ) Notice: Subject to any disclaimer, the term of this patent is extended or adjusted under 35 U.S.C. 154(b) by 0 days.

(21) Appl. No.: 16/089,009

(22) PCT Filed: Mar. 16, 2017

(86) PCT No.: PCT/CN2017/076930
§ 371 (c)(1),
(2) Date: Sep. 27, 2018

(87) PCT Pub. No.: WO2017/167024
PCT Pub. Date: Oct. 5, 2017

(65) Prior Publication Data
US 2019/0090235 A1    Mar. 21, 2019

(30) Foreign Application Priority Data

Apr. 1, 2016    (CN) .......................... 2016 1 0202724

(51) Int. Cl.
*H04W 72/04*    (2009.01)
*H04W 74/00*    (2009.01)
(Continued)

(52) U.S. Cl.
CPC ....... *H04W 72/0446* (2013.01); *H04L 5/0053* (2013.01); *H04W 72/048* (2013.01);
(Continued)

(58) Field of Classification Search
CPC .............................................. H04W 72/0446
(Continued)

(56) References Cited

U.S. PATENT DOCUMENTS

2014/0022964 A1    1/2014 Guan et al.
2015/0365931 A1    12/2015 Ng et al.
(Continued)

FOREIGN PATENT DOCUMENTS

| CN | 102843771 A | 12/2012 |
|---|---|---|
| CN | 104812086 A | 7/2015 |
| CN | 105451358 A | 3/2016 |

OTHER PUBLICATIONS

Wannstrom, Jeanette; Carrier Aggregation explained (Year: 2013).*
(Continued)

*Primary Examiner* — Peter G Solinsky
(74) *Attorney, Agent, or Firm* — Xsensus LLP

(57) ABSTRACT

The disclosure relates to an electronic device and a wireless communication method in a wireless communication system. According to the disclosure, the electronic device comprises one or more processing circuits. The processing circuit is configured to execute the following operation: configure timing mapping information between a downlink subframe carrying uplink scheduling grant signaling and an uplink subframe carrying uplink transmission, comprising physical uplink shared channel PUSCH transmission, scheduled by the uplink scheduling grant signaling, and performed on an unlicensed channel by user equipment in the wireless communication system. By means of the electronic device and the wireless communication method in the disclosure, a timing mapping relationship between a downlink subframe carrying uplink scheduling grant signaling and an uplink subframe carrying uplink transmission comprising PUSCH transmission can be determined, thereby realizing effective utilization of an unlicensed channel.

18 Claims, 23 Drawing Sheets

(51) Int. Cl.
  *H04W 74/02* (2009.01)
  *H04W 72/12* (2009.01)
  *H04L 5/00* (2006.01)
  *H04W 72/14* (2009.01)
  *H04B 7/04* (2017.01)
(52) U.S. Cl.
  CPC ....... *H04W 72/1268* (2013.01); *H04W 72/14* (2013.01); *H04W 74/006* (2013.01); *H04W 74/02* (2013.01); *H04B 7/04* (2013.01)
(58) Field of Classification Search
  USPC ........................................................ 370/366
  See application file for complete search history.

(56) References Cited

U.S. PATENT DOCUMENTS

| | | | | |
|---|---|---|---|---|
| 2016/0278049 A1* | 9/2016 | Nory | ..................... | H04L 1/1896 |
| 2016/0278050 A1* | 9/2016 | Nory | ..................... | H04W 16/14 |
| 2016/0323923 A1 | 11/2016 | Wei | | |
| 2017/0245302 A1* | 8/2017 | Mukherjee | ............. | H04W 16/14 |
| 2018/0175975 A1* | 6/2018 | Um | ........................ | H04L 1/1816 |
| 2018/0199369 A1* | 7/2018 | Larsson | ............... | H04W 74/006 |
| 2018/0324825 A1* | 11/2018 | Jiang | .................... | H04W 72/042 |
| 2018/0359772 A1* | 12/2018 | Park | ....................... | H04W 16/14 |
| 2019/0037600 A1* | 1/2019 | Urabayashi | ........... | H04W 76/27 |
| 2019/0053222 A1* | 2/2019 | Bhorkar | ................ | H04W 16/14 |
| 2019/0306920 A1* | 10/2019 | Son | ................... | H04W 72/0446 |

OTHER PUBLICATIONS

English-language translation of International Search Report and Written Opinion for International Application No. PCT/CN2017/076930, dated May 31, 2017.

* cited by examiner

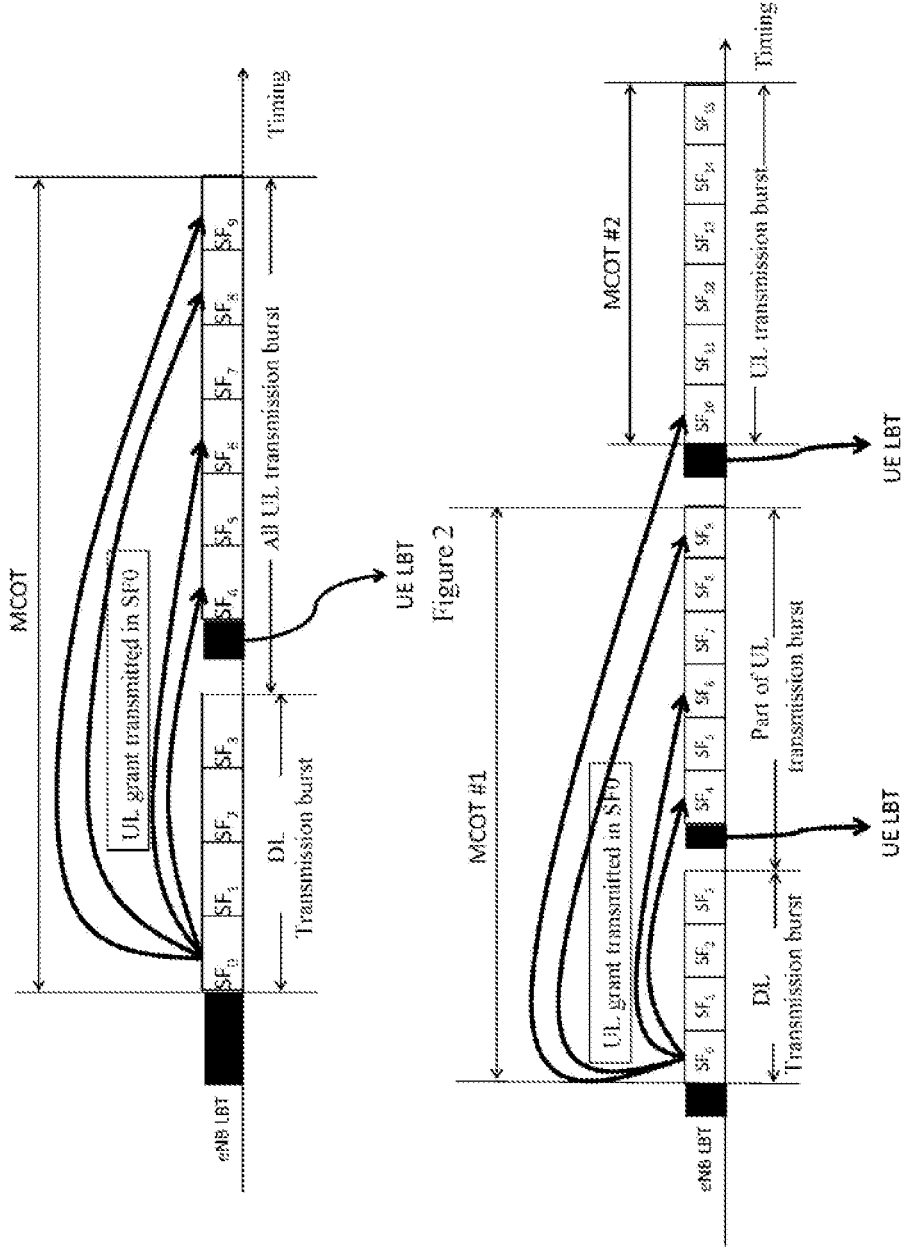

ELECTRONIC DEVICE AND WIRELESS COMMUNICATION METHOD IN WIRELESS COMMUNICATION SYSTEM

The present application claims the priority to Chinese Patent Application No. 201610202724.3, titled "ELECTRONIC DEVICE AND WIRELESS COMMUNICATION METHOD IN WIRELESS COMMUNICATION SYSTEM" filed on Apr. 1, 2016 with the State Intellectual Property Office of the PRC, which is incorporated herein by reference in its entirety.

FIELD

The present disclosure relates to the technical field of wireless communication, and in particular to an electronic device in a wireless communication system and a method for performing wireless communication in a wireless communication system.

BACKGROUND

This section provides background information relating to the present disclosure, which is not necessarily prior art.

With the development and evolution of the wireless network, increasing services are carried by the wireless network, therefore extra spectrum resources are required to support data transmission of a great volume. Based on the existing long term evolution (LTE) network, a cellular wireless network provider starts to discuss how to use unlicensed spectrum resources, such as 5 GHz industrial scientific medical (ISM) frequency band. The present disclosure relates to Licensed Assisted Access (LAA) communication in the wireless communication network.

In the conventional time division duplexing (TDD) and frequency division duplexing (FDD) wireless communication schemes, a mapping relation between a subframe (SF) carrying UL grant signaling and an SF carrying physical uplink shared channel (PUSCH) transmission scheduled by the UL grant signaling is fixed and known. However, in the LAA communication, uplink transmission differs from downlink transmission, therefore the downlink transmission cannot be specified according to the mapping relation determined for downlink. Therefore, when a user equipment (UE) transmits PUSCH on an unlicensed channel, a mapping relation between UL grant and PUSCH transmission scheduled by the UL grant is to be further discussed.

In addition, when the UE performs uplink transmission on the unlicensed channel, the UE needs to perform channel detection process to determine whether the channel is idle. Therefore, for transmission performed on the unlicensed channel, there are problems to be solved urgently: which type of channel detection process shall be performed at a specific phase and whether to adjust the channel detection parameter in different uplink transmission durations.

Therefore, for at least one of the above problems, it is necessary to provide a new wireless communication technical solution, to solve the problem of the PUSCH transmission performed by the UE on the unlicensed channel, thereby utilizing the unlicensed channel effectively.

SUMMARY

This section provides a general summary of the present disclosure, and is not a comprehensive disclosure of its full scope or all of its features.

An object of the present disclosure is to provide an electronic device in a wireless communication system and a method for performing wireless communication in a wireless communication system, such that an unlicensed channel can be utilized effectively.

According to an aspect of the present disclosure, an electronic device in a wireless communication system is provided. The electronic device includes one or more processing circuits configured to perform an operation of: configuring timing mapping information between a downlink subframe carrying uplink grant signaling and an uplink subframe carrying uplink transmission including Physical Uplink Shared Channel (PUSCH) transmission performed on an unlicensed channel by a user equipment in the wireless communication system scheduled by the uplink grant signaling.

According to another aspect of the present disclosure, an electronic device in a wireless communication system is provided. The electronic device includes one or more processing circuits configured to perform operations of acquiring downlink signaling from a base station in the wireless communication system; and extracting, from the downlink signaling, timing mapping information between a downlink subframe carrying uplink grant signaling and an uplink subframe carrying uplink transmission including Physical Uplink Shared Channel (PUSCH) transmission performed on an unlicensed channel scheduled by the uplink grant signaling.

According to another aspect of the present disclosure, a wireless communication system is provided. The wireless communication system includes a base station and a user equipment. The base station includes: a first transceiver; and one or more first processing circuits configured to perform operations of: configuring timing mapping information between a downlink subframe carrying uplink grant signaling and an uplink subframe carrying uplink transmission including Physical Uplink Shared Channel (PUSCH) transmission performed on an unlicensed channel by a user equipment scheduled by the uplink grant signaling; and causing the first transceiver to notify the user equipment of the timing mapping information. The user equipment includes: a second transceiver; and one or more second processing circuits configured to perform operations of: acquiring downlink signaling from the base station by the second transceiver; and extracting the timing mapping information from the downlink signaling.

According to another aspect of the present disclosure, a method for performing wireless communication in a wireless communication system is provided. The method includes: configuring timing mapping information between a downlink subframe carrying uplink grant signaling and an uplink subframe carrying uplink transmission including Physical Uplink Shared Channel (PUSCH) transmission performed on an unlicensed channel by a user equipment in the wireless communication system scheduled by the uplink grant signaling; and notifying the user equipment of the timing mapping information.

According to another aspect of the present disclosure, a method for performing wireless communication in a wireless communication system is provided. The method includes: acquiring downlink signaling from a base station in the wireless communication system; and extracting, from the downlink signaling timing mapping information between a downlink subframe carrying uplink grant signaling and an uplink subframe carrying uplink transmission including Physical Uplink Shared Channel (PUSCH) transmission performed on an unlicensed channel scheduled by the uplink grant signaling.

With the electronic device in the wireless communication system and the method for performing wireless communication in the Wireless communication system according to the present disclosure, timing mapping relation between a downlink subframe carrying uplink grant signaling and an uplink subframe carrying uplink transmission including PUSCH transmission can be determined, thereby utilizing the unlicensed channel effectively.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings:

FIG. 2 is a schematic diagram showing a relation between UL grant and UL transmission burst within the same MCOT;

FIG. 3 is a schematic diagram showing a relation between UL grant and UL transmission burst in different MCOTs;

Figure 1:
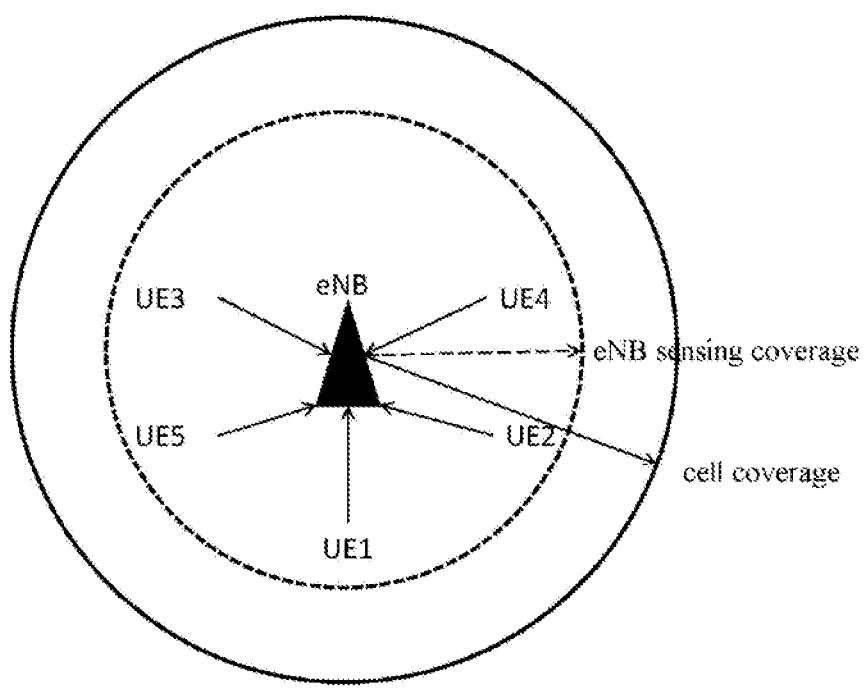
FIG. 1 is a schematic diagram showing PUSCH transmission on an unlicensed frequency band.

While the present disclosure is susceptible to various modifications and alternative forms, specific embodiments thereof have been shown by way of example in the drawings and are herein described in detail. It should be understood, however, that the description herein of specific: embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided such that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A user equipment (UE) involved in the present disclosure includes but not limited to terminals with a wireless communication function such as a mobile terminal, a computer, and an on-board device. Further, depending on the described functions, the UE involved in the present disclosure may be the UE itself or components in the UE such as a chip. In addition, similarly, the base station involved in the present disclosure may be an evolution Node Base station (eNB) or components in the eNB such as a chip.

In the present disclosure, it is considered that channels correspond to carriers, that is, one carrier corresponds to one channel. In the following description, carriers and channels are not distinguished particularly. In addition, according to an embodiment of the present disclosure, a channel detection process is used to detect whether a channel is idle. The channel detection process may be a listen before talk (LBT) process. In some embodiments below, a multiple carrier channel detection process according to the present disclosure is illustrated by taking the LBT process as an example. It should be noted that, in the present disclosure, the channel detection process is not limited to the LBT process, and includes other types of channel detection process. For the other types of channel detection process, the device and method according to the present disclosure can be achieved similarly.

For an enhanced licensed assisted access (eLAA) physical uplink shared channel (PUSCH), at least multi-cluster transmission (greater than 2) for a resource block (RB) level is supported, and its detailed design is to be further discussed. In addition, supporting or legacy resource allocation of the PUSCH is to be further discussed.

For the eLAA, flexible timing mapping between uplink (UL) grant and UL transmission may be supported.

For subframes causing the UE to be capable of performing PUSCH transmission in multiple subframes of a secondary service cell (Scell) for LAA, at least the following items should be considered for details of one or more UL grant for the UE.

Item 1): for a single UL grant in one subframe of the LTE, N PUSCH transmissions for the UE in N (N≥1) subframes may be scheduled. Each subframe is used for a single PUSCH. Here, N subframes may be continuous or not.

Item 2): for a single UL grant in a subframe of the UE, a single PUSCH transmission in a single subframe may be scheduled. However, the UE may receive multiple UL grant in one subframe, for PUSCH transmissions in different subframes.

Item 3): according to a UL LBT result, for a single UL grant in a subframe of the UE is caused to perform a single PUSCH transmission in one of multiple subframes.

In addition, two stages of grant may be performed. A common semi-persistent grant may provide advanced information, such as resource block (RB) allocation, and modulation and coding scheme (MCS). For second grant of subframes of the UE, PUSCH transmission may be scheduled, which follow the items 1) and 2) mentioned above for some UL subframes.

For UL transmission in the Scell of eLAA, flexible timing mapping between subframes carrying UL grant and (one or more) subframes carrying corresponding (one or more) PUSCHs may be supported. For example, it may be assumed that a minimum delay is 4 milliseconds.

One or more UL grant for the UE in the subframe may achieve PUSCH transmission for the UE in multiple subframes of the Scell for LAA, which adapts to both cross-carrier scheduling and self-carrier scheduling.

FIG. 1 shows a scene of PUSCH transmission on an unlicensed frequency band by taking self-carrier scheduling as an example. As shown in FIG. 1, a dotted line surrounding eNB indicates a sensing coverage of the eNB, and a solid line surrounding the eNB indicates a coverage of a cell. When performing the self-carrier scheduling, the eNB needs to perform channel sensing to transmit uplink grant to a user equipment on an unlicensed frequency band. In response to the scheduling of the uplink grant, user equipments UE1 to UE5 in the cell may perform PUSCH transmission via the unlicensed frequency band. In a case of cross-carrier scheduling, similarly, the user equipment may perform PUSCH transmission on the unlicensed frequency band in response to the scheduling of the uplink grant.

There are two candidate cases for the PUSCH transmission on the unlicensed frequency band. FIG. 2 shows a relation between UL grant and UL transmission burst within the same Maximum Channel Occupancy Time (MCOT) of the eNB in a case that eNB detects that a channel of an unlicensed frequency band is idle. The MCOT refers to maximum time during which continuous transmission is allowed on the unlicensed frequency band. A size of the MCOT may be determined based on a channel use priority. The transmission burst may be defined as follows: each transmission burst is continuous transmission from the UE/eNB and there is no transmission immediately previous or immediately next to the transmission burst from the same UE/eNB on the same component carrier (CC).

As shown in FIG. 2, firstly, the eNB performs a complex channel detection process (Cat-4: an energy detection process including random backoff and a variable contention window size, for example) to access to the unlicensed frequency band. In a case that the channel is detected to be idle, the eNB transmits one or more UL grant on a subframe (SF) 0. Here, it is assumed that SF0 to SF3 are used for downlink (DL) transmission burst, and SF4 to SF9 are used for UL transmission burst. Before performing UL transmission, the UE needs to perform a channel detection process.

In FIG. 2, the SF carrying UL grant and UL transmission including PUSCH transmission are within the same MCOT. Therefore, it can be considered that a sum of the DL transmission burst and all UL transmission burst is less than or equal to the MCOT.

FIG. 3 shows a relation between UL grant and UL transmission burst beyond the same MCOT of the eNB in a case that eNB detects that the channel of the unlicensed frequency band is idle.

As shown in FIG. 3, firstly, the eNB performs a complex channel detection process (an energy detection process including random backoff and a variable contention window size, for example) to access to the unlicensed frequency band. In a case of successful channel detection, the eNB transmits one or more UL grant on an SF0. Here, it is assumed that SF0 to SF3 are used for DL transmission burst, and SF4 to SF15 are used for UL transmission burst. Before performing the UL transmission, the UE needs to perform a channel detection process.

In FIG. 3, a first MCOT (MCOT #1) includes DL transmission burst and a part of UL transmission burst, and a second MCOT (MCOT #2) includes only UL transmission burst. As shown in FIG. 3, one or more SFs carrying UL grant and PUSCH transmission go beyond the same MCOT of the eNB. That is, a sum of the DL transmission burst and all UL transmission burst is greater than MCOT #1.

Flexible timing mapping may be performed between SF carrying UL grant and one or more SF carrying one or more PUSCH transmissions. Particularly one UL grant may schedule multiple PUSCH transmissions. Each PUSCH transmission is carried by one SF, and different PUSCH transmissions are carried by different SFs. Further, a timing mapping relationship between SF carrying the UL grant and multiple SFs carrying multiple PUSCH transmissions may be configured flexibly, and the configured timing mapping relation may be included in timing mapping information. In another aspect, one UL grant may schedule only one PUSCH transmission. Similarly, a timing mapping relation between SF carrying the UL grant and SF carrying this PUSCH transmission may be configured flexibly, and the configured timing mapping relation may also be included in the timing mapping information.

In addition, if all PUSCH transmissions of the UE on the unlicensed channel fall within the MCOT of the eNB (as shown in FIG. 2), the UE may perform a simple channel detection process (cat-2: an energy detection process excluding random backoff, for example). If the channel is detected to be idle, the UE may perform PUSCH transmission. However, if the PUSCH transmission of the UE on the unlicensed channel falls beyond the MCOT of the eNB (as shown in FIG. 3), the UE performs a complex channel detection process (cat-4: an energy detection process including random backoff and a variable contention window size, for example) (for example before SF10).

Further, when the UE performs a complex channel detection process on at least one unlicensed carrier, the UE may need to perform a contention window size (CWS) adjustment, to generate a counter used during the complex channel detection process based on the adjusted CWS, thereby solving the problem of PUSCH transmission performed by the UE our the unlicensed channel and utilizing the unlicensed channel effectively.

In the following, it is further described by taking self-carrier scheduling as an example, and the present disclosure is not limited to such case.

Figure 4:
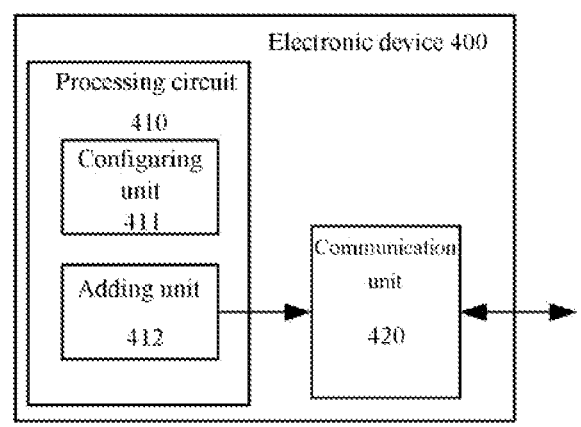
FIG. 4 is a block diagram showing a structure of an electronic device in a wireless communication system according to an embodiment of the present disclosure.

Firstly, timing mapping design of UL grant is described according to an embodiment of the present disclosure. FIG. 4 shows a structure of an electronic device 400 in a wireless communication system according to an embodiment of the present disclosure.

As shown in FIG. 4, the electronic device 400 may include a processing circuit 410. It should be noted that, the electronic device 400 may include one processing circuit 410 or multiple processing circuits 410. In addition, the electronic device 400 may further include a communication unit 420 as a transceiver and so on.

Further, the processing circuit 410 may include various discrete functional units to perform various functions and/or operations. It should be noted that, the functional units may be physical entities or logical entities, and units with different names may be implemented by the same physical entity.

For example, as shown in FIG. 4, the processing circuit 410 may include a configuring unit 411. In addition, the processing circuit 410 may further include an adding unit 412.

The configuring unit 411 may configure timing mapping information between a downlink subframe carrying uplink grant signaling and an uplink subframe carrying uplink transmission including PUSCH transmission performed on an unlicensed channel by a UE scheduled by the uplink grant signaling. In the present disclosure, the uplink grant signaling may be UL grant signaling described above.

With the electronic device 400 according to the embodiment of the present disclosure, a timing mapping relation between the downlink subframe carrying the uplink grant signaling and the uplink subframe carrying uplink transmission including PUSCH transmission can be determined, thereby utilizing the unlicensed channel effectively.

According to a preferred embodiment of the present disclosure, the adding unit 412 may add the timing mapping information to physical layer signaling or media access control (MAC) layer signaling, to notify the UE.

According to a preferred embodiment of the present disclosure, when configuring the timing mapping information, the configuring unit 411 may map one downlink subframe carrying one uplink grant signaling to multiple uplink subframes carrying uplink transmission including PUSCH transmission scheduled by the uplink grant signaling. Then, the adding unit 412 may add the timing mapping information to the uplink grant signaling.

According to a preferred embodiment of the present disclosure, L1 signaling indicates clear timing mapping information between SF carrying one UL grant and SF carrying corresponding PUSCH transmission. In one SF, a single UL grant may include scheduling information valid for multiple SFs. Such explicit signaling may be generated based each carrier.

Figure 5:
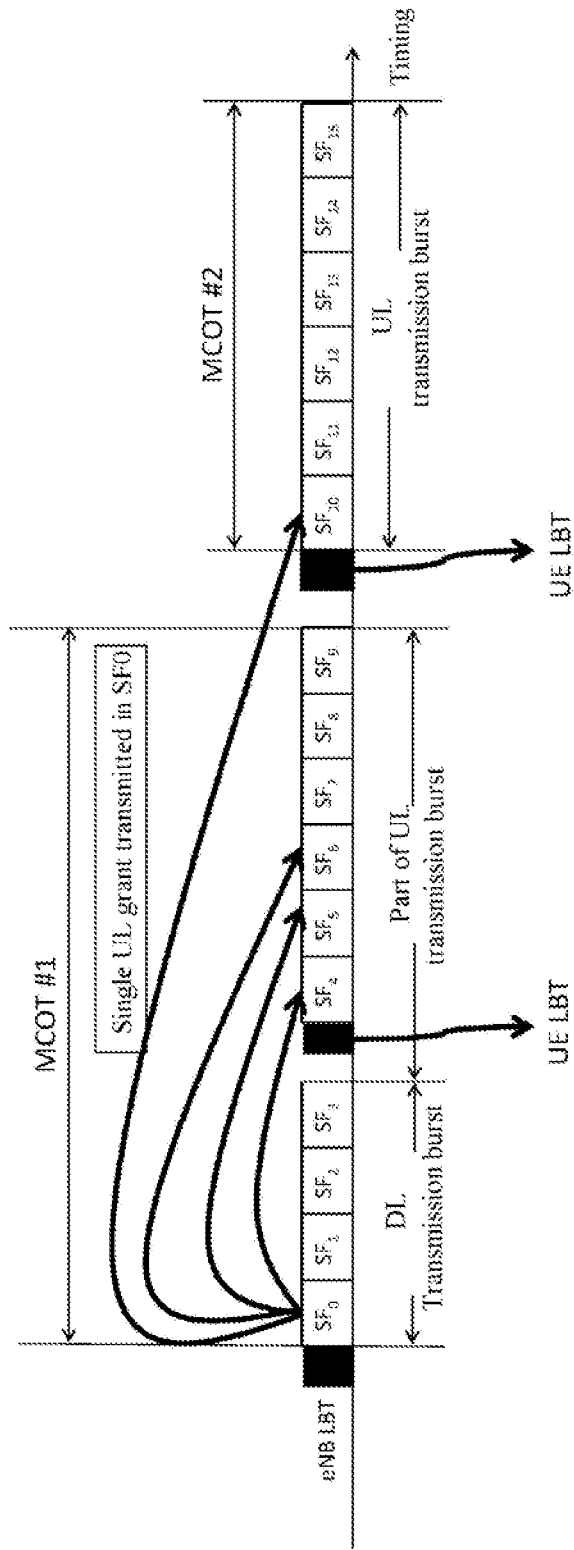
FIG. 5 is a schematic diagram showing UL grant design according to a preferred embodiment of the present disclosure.

FIG. 5 shows a schematic diagram of UL grant design according to a preferred embodiment of the present disclosure. As shown in FIG. 5, firstly, the eNB performs a complex channel detection process (an energy detection process including random backoff and a variable contention window size) to access to an unlicensed frequency band. In a case of successful channel detection, the eNB has one MCOT on the unlicensed frequency band. The eNB transmits one UL grant in SF0. Here, it is assumed that SF0 and SF3 are used for DL transmission burst, and SF4 and SF15 are used for UL transmission burst. Before performing UL transmission, the UE needs to perform a channel detection process.

Similar to FIG. 3, in FIG. 5, a first MCOT (MCOT #1) includes DL transmission burst and a part of UL transmission burst, and a second MCOT (MCOT #2) includes only UL transmission burst.

In FIG. 5, the UE receives one UL grant including information in SF0. The information indicates that the UL grant is valid for SF4, SF5, SF6 and SF10. If PUSCH may be transmitted after the LBT process and the UE needs to perform PUSCH transmission, the UE may perform PUSCH transmission in SF4, SF5, SF6 and SF10.

In order to add the timing mapping information to the uplink grant signaling, the adding unit 412 may reuse 10 filling bits in UL grant, and each bit indicates whether to schedule a certain UE in an upcoming SF.

For example, in Bit0, Bit1, Bit2, . . . , Bit9, "0" indicates that the UE is scheduled and "1" indicates that the UE is not scheduled. If the UE receives one UL grant in a subframe N, Bit0 indicates whether to schedule the UE in a subframe N+4, Bit1 indicates whether to schedule the UE in a subframe N+5, and so on, and Bit9 indicates whether to schedule the UE in a subframe N+13.

In this way, a timing mapping relation between one downlink subframe carrying UL grant such as SF0 and multiple uplink subframes carrying the PUSCH transmission such as SF4, SF5, SF6 and SF10 can be determined, and positions of the multiple uplink subframes carrying the PUSCH transmission may be adjusted flexibly, thereby utilizing the unlicensed channel effectively.

According to another preferred embodiment of the present disclosure, one downlink subframe may carry multiple uplink grant signaling. In this case, the configuring unit 411 may configure each piece of timing mapping information between a downlink subframe carrying each of the multiple uplink grant signaling and one uplink subframe carrying uplink transmission including PUSCH transmission scheduled by each of the multiple uplink grant signaling. Then, the adding unit 412 may add the timing mapping information to each of the multiple uplink grant signaling, to notify the UE.

According to another preferred embodiment of the present disclosure, L1 signaling indicates clear timing mapping information between SF carrying multiple UL grant and SF carrying corresponding uplink transmission including PUSCH transmission. In one SF, the UE may receive multiple UL grant, and each UL grant is used (to perform PUSCH transmission) by one SF. Such explicit signaling may be generated based on each carrier.

Figure 6:
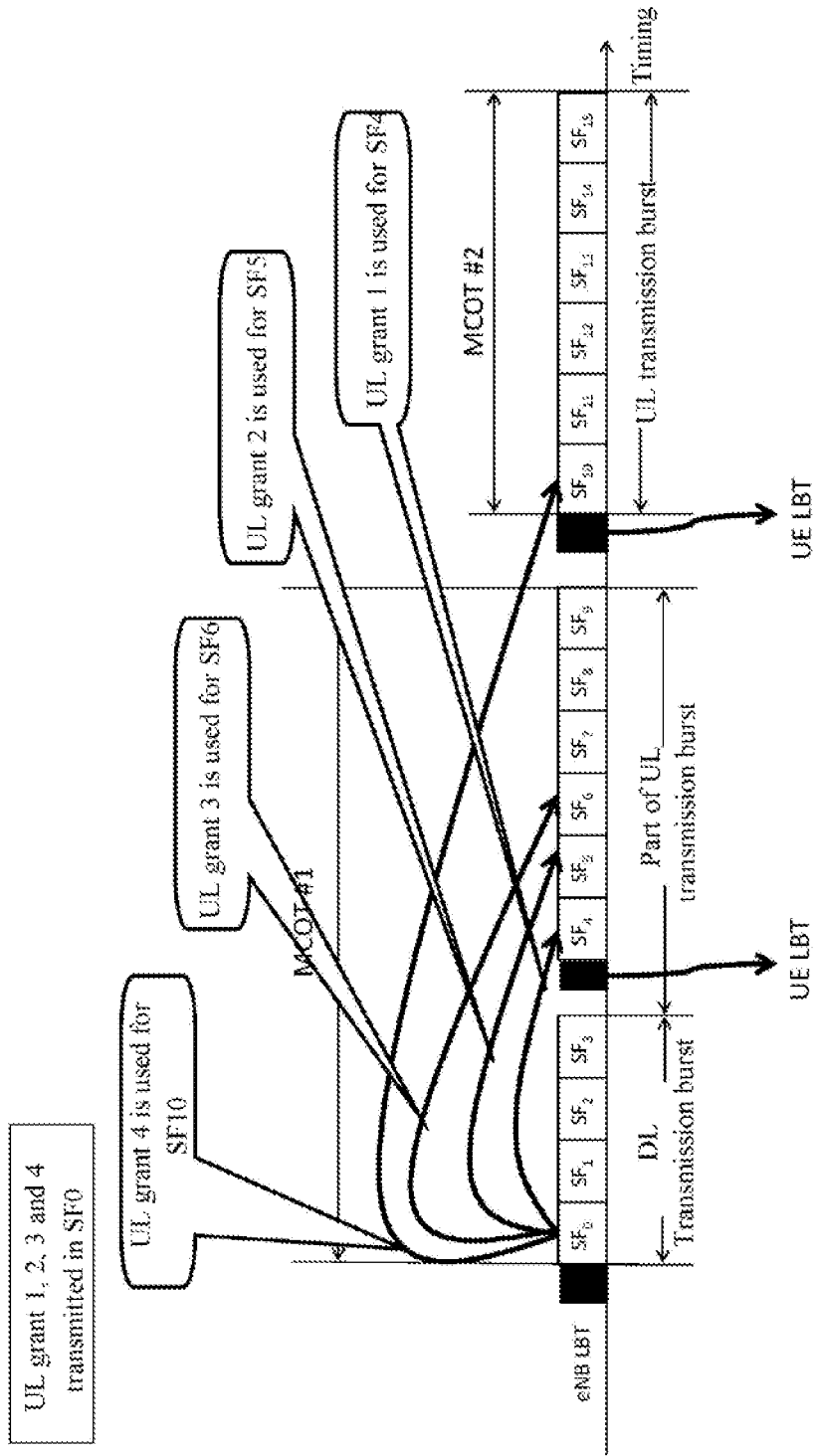
FIG. 6 is a schematic diagram showing UL grant design according to another preferred embodiment of the present disclosure.

FIG. 6 shows a schematic diagram of UL grant design according to another preferred embodiment of the present disclosure. As shown in FIG. 6, firstly, the eNB performs a complex channel detection process (an energy detection process including random backoff and a variable contention window size, for example) to access to an unlicensed frequency band. In a case of successful channel detection, the eNB transmits 4 UL grant in SF0. Here, it is assumed that SF0 to SF3 are used for DL transmission burst, and SF4 to SF15 are used for UL transmission burst. Before performing the UL transmission, the UE needs to perform a channel detection process.

Similar to FIG. 3 and FIG. 5, in FIG. 6, a first MCOT (MCOT #1) includes DL transmission burst and a part of UL transmission burst, and a second MOOT (MCOT #2) includes only transmission burst.

In FIG. 6, the UE receives multiple (4) Ut grant in SF0. In each UL grant, clear mapping information is added. For example, UL grant 1 is valid for SF4, UL grant 2 is valid for SF5, UL grant 3 is valid for SF6, and UL grant 4 is valid for SF10, and so on.

If PUSCH can be transmitted after the LBT process and the UE needs to perform PUSCH transmission, the UE will perform PUSCH transmission in SF4, SF5, SF6 and SF10.

Format design of multiple UL grant may be as follows. For the conventional UL grant, decoding may be performed for N times to obtain UL grant 1, UL grant 2, . . . , UL grant N. For a cascaded UL grant, decoding may be performed once to obtain UL grant1+UL grant 2+, . . . , +UL grant N.

In this way, the timing mapping relation between one downlink subframe such as SF0 carrying multiple UL grant such as UL grant 1, UL grant 2, UL grant 3 and UL grant 4 and multiple uplink subframes carrying PUSCH transmission such as SF4, SF5, SF6 and SF10 can be determined thereby utilizing the unlicensed channel effectively.

Figure 7:
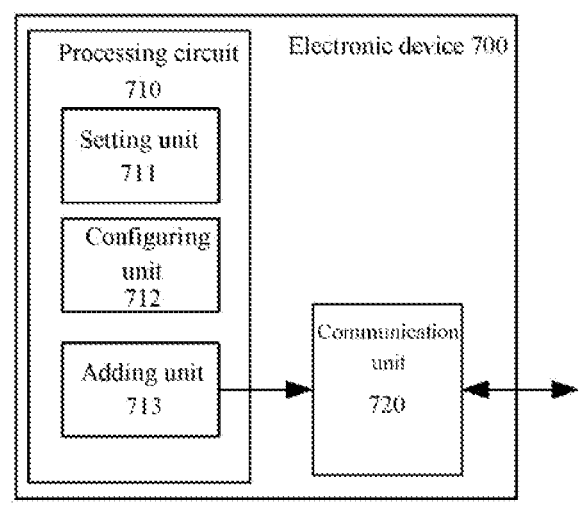
FIG. 7 is a block diagram showing a structure of an electronic device in a wireless communication system according to another embodiment of the present disclosure.

FIG. 7 shows a structure of an electronic device 700 in a wireless communication system according to another embodiment of the present disclosure.

As shown in FIG. 7, the electronic device 700 may include a processing circuit 710. It should be noted that, the electronic device 700 may include one processing circuit 710 or multiple processing circuits 710. In addition, the electronic device 700 may include a communication unit 720 as a transceiver and so on.

Further, the processing circuit 710 may include various discrete functional units to perform various different functions and/or operations. It should be noted that, the functional units may be physical entities or logical entities, and units with different names may be implemented by the same physical entity.

For example, as shown in FIG. 7, the processing circuit 710 may include a setting unit 711, a configuring unit 712 and an adding unit 713.

The setting unit 711 may set one uplink grant signaling to be capable of scheduling PUSCH transmission carried by all uplink subframes before a next downlink subframe carrying a next uplink grant signaling.

The configuring unit 712 may configure actual timing mapping information between a downlink subframe carrying one uplink grant signaling and uplink subframe actually carrying uplink transmission including PUSCH transmission scheduled by the one uplink grant signaling.

The adding unit 713 may add actual timing mapping information to physical layer signaling or MAC layer signaling, to notify the UE.

In the technical solution shown in FIG. 7, in one SF, the UE may receive a single UL grant. The UL grant is valid for all upcoming uplink SFs until the UE receives a new UL grant. Such implicit signaling may be generated based on each carrier. In addition, the UE may further receive explicit mapping information indicating whether to perform scheduling in the upcoming multiple uplink SFs (via L1 or MAC signaling).

Figure 8:
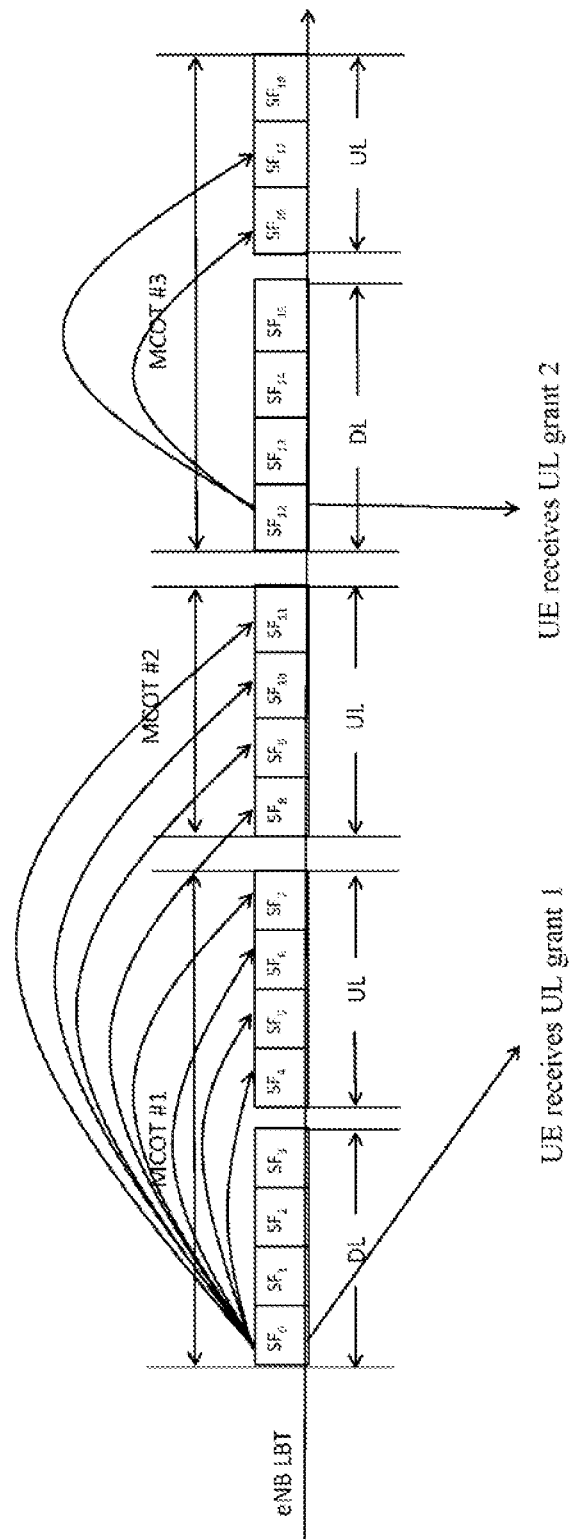
FIG. 8 is a schematic diagram showing implicit signaling design according to an embodiment of the present disclosure.

At a first phase, it is assumed that one UL grant is valid for all upcoming uplink SFs, until the UE receives another UL grant. FIG. 8 shows a schematic diagram of implicit signaling design according to an embodiment of the present disclosure.

As shown in FIG. 8, firstly, the eNB performs a complex channel detection process (an energy detection process including random backoff and a variable contention window size, for example) to access to an unlicensed frequency band. In a case of successful channel detection, the UE receives UL grant 1 in SF0. Here, it is assumed that SF0 to SF3 are used for DL transmission burst, and SF4 to SF11 are used for UL transmission burst. In the present embodiment, UL grant 1 is valid for SF4 to SF11.

Subsequently, in SF12, the UE receive UL grant 2. In this case, UL grant 1 becomes invalid. Here, it is assumed that SF12 to SF15 are used for DL transmission burst, and SF16 to SF18 are used for UL transmission burst. In the present embodiment, UL grant 2 is valid for SF16 to SF18, until the UE receives a next UL grant.

At a second phase, the UE may receive scheduling information indicating whether to perform scheduling in an upcoming SF.

In order to obtain the scheduling information, filling bits in UL grant (alternatively, bits in other physical layer signaling or MAC signaling) may be reused, for example. Each bit indicates whether to schedule a certain UE in the upcoming SF. Table 1 shows a relation between bits and whether to schedule a UE in SFs.

TABLE 1

| | Bit 0 | Bit 1 | Bit 2 | Bit 3 | Bit 4 | Bit 5 | Bit 6 | Bit 7 | Bit 8 | Bit 9 |
|---|---|---|---|---|---|---|---|---|---|---|
| SF | N + 4 | N + 5 | N + 6 | N + 7 | N + 8 | N + 9 | N + 10 | N + 11 | N + 12 | N + 13 |
| Whether to schedule a UE | 1 | 1 | 1 | 0 | 0 | 0 | 1 | 0 | 0 | 0 |

In Table 1, among Bit0, Bit1, Bit2, . . . , Bit9, "0" indicates that the UE is not scheduled and "1" indicates that the UE is scheduled. If the UE receives one UL grant in a subframe N, Bit0 indicates whether to schedule the UE in subframe N+4, Bit1 indicates whether to schedule the UE in subframe N+5, and so on, and Bit9 indicates whether to schedule the UE in subframe N+13.

Table 1 shows that the UE is to be scheduled in SF4, SF5, SF6 and SF10.

In this way, the timing mapping relation between the downlink subframe carrying the UL grant and the multiple uplink subframes carrying PUSCH transmission can also be determined, thereby utilizing the unlicensed channel effectively.

Figure 9:
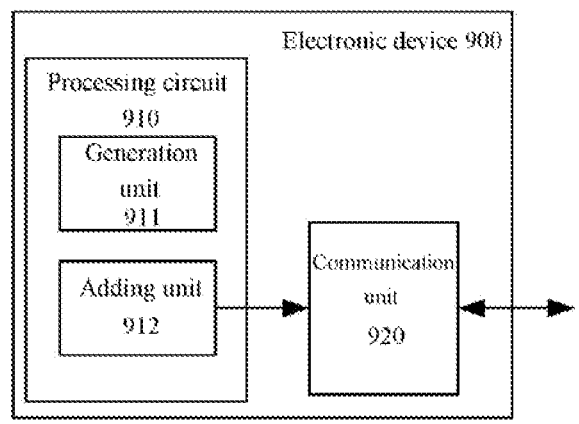
FIG. 9 is a block diagram showing a structure of an electronic device in a wireless communication system according to another embodiment of the present disclosure.

The timing mapping design of UL grant according to the embodiment of the present disclosure is described above. Subsequently, design of channel detection type indication signaling according to an embodiment of the present disclosure is described. FIG. 9 shows a structure of an electronic device 900 in a wireless communication system according to an embodiment of the present disclosure.

As shown in FIG. 9, the electronic device 900 may include a processing circuit 910. It should be noted that, the electronic device 900 may include one processing circuit 910 or multiple processing circuits 910. In addition, the electronic device 900 may include a communication unit 920 as a transceiver and so on.

Further, the processing circuit 910 may include various discrete functional units to perform various different functions and/or operations. It should be noted that, the functional units may be physical entities or logical entities, and units with different names may be implemented by the same physical entity.

For example, as shown in FIG. 9, the processing circuit 910 may include a generation unit 911 and an adding unit 912.

The generation unit 911 may generate configuration information on a channel detection type of a channel detection process performed by the UE before performing uplink transmission including PUSCH transmission on an unlicensed channel.

The adding unit 912 may add configuration information generated by the generation unit 911 to physical layer signaling, to notify the UE.

With the electronic device 900 according to the embodiment of the present disclosure, the channel detection type of the channel detection process performed by the UE before performing uplink transmission including PUSCH transmission on the unlicensed channel can be determined, thereby utilizing the unlicensed channel effectively.

Figure 10:
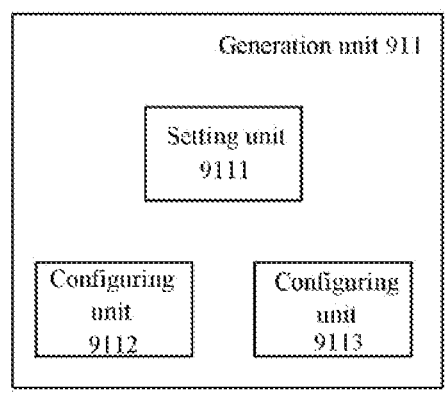
FIG. 10 is a block diagram showing a structure of a generation unit included in the electronic device shown in FIG. 9.

FIG. 10 shows an example of a structure of the generation unit 911 included in the electronic device 900 in FIG. 9. The generation unit 911 may include a setting unit 9111 and configuring units 9112 and 9113.

According to a preferred embodiment of the present disclosure, the setting unit 9111 may set multiple unlicensed carriers on the unlicensed channel to be independent from each other.

For each of the multiple unlicensed carriers, the configuring unit 9112 may configure the channel detection type to be a first channel detection process (Cat-2), in a case that uplink subframe carrying PUSCH transmission falls within the MCOT.

In another aspect, for each of the multiple unlicensed carriers, the configuring unit 9113 may configure the channel detection type to be a second channel detection process (Cat-4), in a case that uplink subframe carrying PUSCH transmission falls beyond the MCOT.

According to an embodiment of the present disclosure, channel detection may include feature detection and energy detection. In a case of the feature detection, the channel detection includes preamble detection and public land mobile network (PLMN)+primary synchronization signal (PSS)/secondary synchronization signal (SSS) detection. In a case of the energy detection, the channel detection process may include: (a) energy detection excluding random backoff; (b) energy detection including random backoff and a fixed CWS; and (c) energy detection including random backoff and a variable contention window size. In the type (a), data transmission is directly performed when the energy detection indicates idle. In the types (b) and (c), the channel detection process includes two phases. A first phrase includes an initial detection duration and a random backoff duration. A second phase includes a self-deferral duration (optionally). It enters the random backoff duration after the initial detection duration ends. Energy detection is still performed in the random backoff duration, and in which a random backoff counter (also referred to as a counter) is set to perform backoff. In a case that the energy detection indicates that the channel is occupied, counting of the random backoff counter is interrupted, and the random backoff counter is set based on the CWS. At the defer phase, it is further sensed whether the channel is idle; and if the channel is idle, the random backoff counter continues to count down, until the counting ends. In a case that the channel is detected to be idle and a time slot for performing data transmission does not come, it enters the self-defer phase to wait for the coming of the time slot for performing data transmission. Energy detection is still performed at the self-defer phase, and the channel cannot be used to perform data transmission when it is detected that the channel is occupied. In other words, in the types (b) and (c), energy detection is performed at the two phases of the channel detection process, i.e., the initial detection duration, the random backoff duration and the self-defer duration. The type (b) mainly differs from the type (c) in that: in the type (b), CWS is fixed, while in the type (c), CWS is variable. The energy detection includes a detection period. Taking the types (b) and (c) as examples, the detection period includes the initial detection duration, the random backoff duration and the self-defer duration. When the detection period expires, it is indicated that the energy detection or the channel detection is completed.

In the embodiment of the present disclosure, the channel detection process in the type (a) excludes random backoff, and includes only an energy detection process for a period.

For example, during the energy detection process, data transmission may be performed on the unlicensed carrier if the unlicensed carrier is detected to be idle. The duration of the detection process may be selected as needed, for example, greater than 25 μs. In the embodiment, it may be determined whether the unlicensed carrier is idle according to any existing or known method. For example, the energy detection is performed by the following method. If energy detected on the unlicensed carrier is less than an energy detection threshold during the energy detection process, it is indicated that the unlicensed carrier is in an idle state.

According to the embodiment of the present disclosure, the eNB may select different channel detection processes from the above multiple channel detection processes according to actual requirements and content to be transmitted. Preferably, the eNB may select the first channel detection process and the second channel detection process, and the first channel detection process is simpler than the second channel detection process.

According to the embodiment of the present disclosure, in the first channel detection process, energy detection excluding random backoff may be performed. That is, the first channel detection process is an energy detection process for a period. During the energy detection process, data transmission may be performed on the unlicensed carrier if the unlicensed carrier is detected to be idle.

According to the embodiment of the present disclosure, in the second channel detection process, energy detection including random backoff and a variable CWS may be performed. That is, the second channel detection process may include the initial detection duration, the random backoff duration and the self-defer duration, and the CWS is variable.

According to the embodiment of the present disclosure, in the first channel detection process, the energy detection process may be performed once. In the second channel detection process, the energy detection process may be performed for multiple times. As mentioned above, the second channel detection process may include two phases, and the energy detection process is performed both at the two phases. That is, in the second channel detection process, the energy detection process may be performed for multiple times. The first channel detection process is an energy detection process for a period. During the energy detection process, data transmission is performed on the unlicensed carrier if the unlicensed carrier is detected to be idle. That is, in the first channel detection process, the energy detection process may be performed once.

According to the embodiment of the present disclosure, the first channel detection process is simpler than the second channel detection process, therefore power consumption of the first channel detection process is lower. If the electronic device performs only the first channel detection process on the unlicensed carrier, power consumption of the electronic device can be reduced greatly.

According to the embodiment of the present disclosure, the eNB may determine and indicate a channel detection type of a channel detection process (such as the LBT process) performed by the UE before UL transmission is performed on multiple carriers of the unlicensed frequency band. For example, the eNB may indicate the channel detection type by reusing downlink control information (DCI) format 1C, which is described in detail later.

The eNB determines a channel detection type of the UE on the multiple carriers with the following manner. Firstly, the eNB needs to select a type of a multiple carrier sensing process. For example, Type A multiple carrier operation indicates that a sensing process is performed independently on each configured carrier (that is, multiple unlicensed carriers on the unlicensed channel are set to be independent from each other) and generally the second channel detection process described above is performed. Further, Type B multiple carrier operation indicates that one of the multiple unlicensed carriers of the unlicensed channel is set as a primary channel and other unlicensed carriers are set as secondary channels. The primary channel generally performs the second channel detection process described above, and the secondary channels generally perform the first channel detection process described above.

In a case that the eNB selects the Type A multiple carrier operation and PUSCH transmission of the UE falls beyond the MCOT of the eNB, the UE should perform the second channel detection process to ensure validity of the channel detection process. In another aspect, if the PUSCH transmission of the UE falls within the MCOT of the eNB, the UE may perform the first channel detection process to reduce power consumption of the electronic device.

Based on the rule described above, the eNB can configure a type of a channel detection process performed by the UE on each configured carrier.

Figure 11:
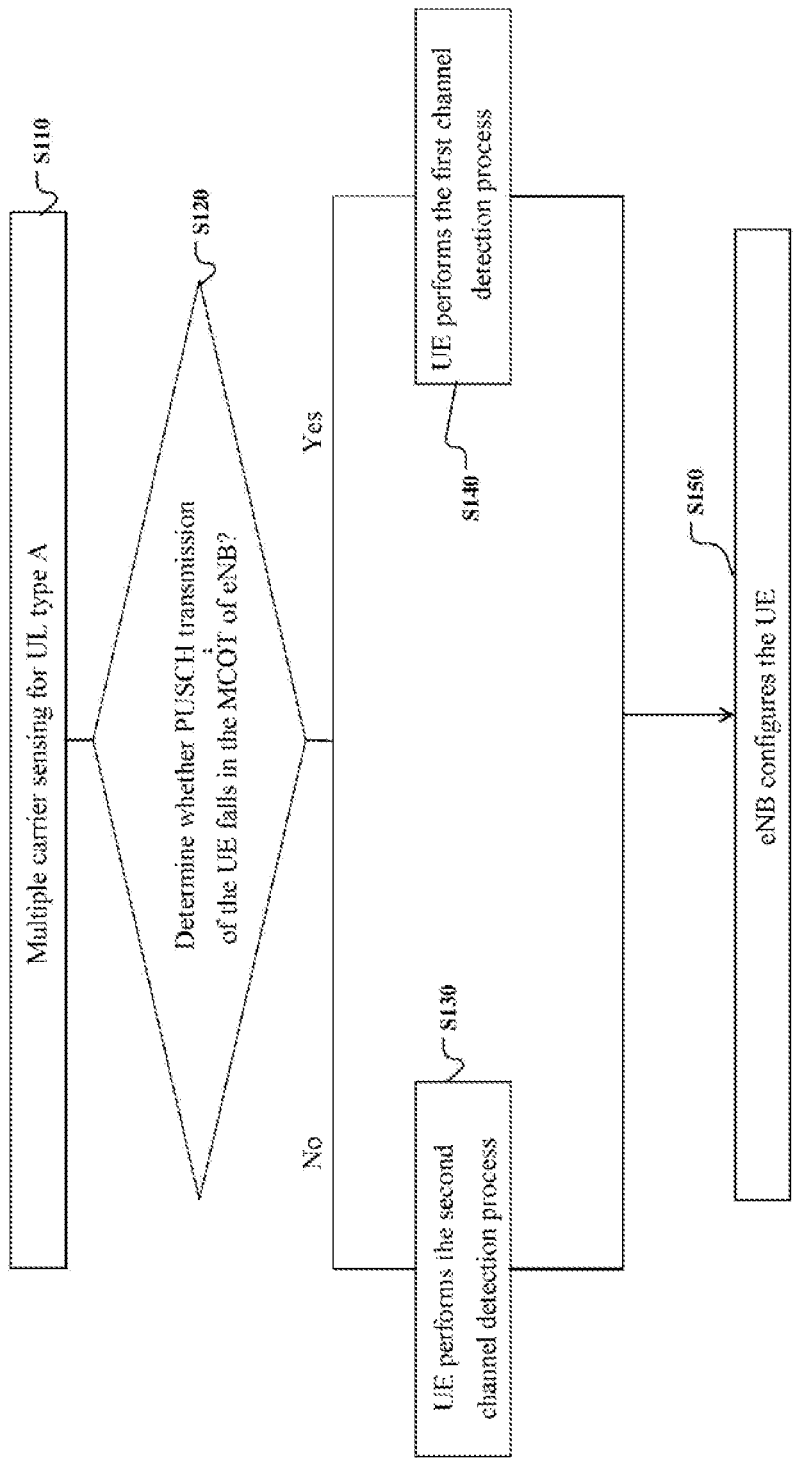
FIG. 11 is a flowchart showing a channel detection type configuration when a Type A multiple carrier operation is used.

FIG. 11 shows a flowchart of a channel detection type configuration when a Type A multiple carrier operation is used, in a case of self-carrier scheduling.

As shown in FIG. 11, in step S110, the eNB selects Type A multiple carrier sensing for UL.

Subsequently, in step S120, the eNB determines whether PUSCH transmission of the UE falls within the MCOT of the eNB.

If the eNB determines that the PUSCH transmission of the UE falls within the MCOT of the eNB the UE performs the first channel detection process in step S140.

In another aspect, if the eNB determines that PUSCH transmission of the UE falls beyond the MCOT of the eNB, the UE performs the second channel detection process in step S130.

Finally, in step S150, the eNB notifies the UE of a result of the channel detection type configuration, to configure the UE.

Figure 12:
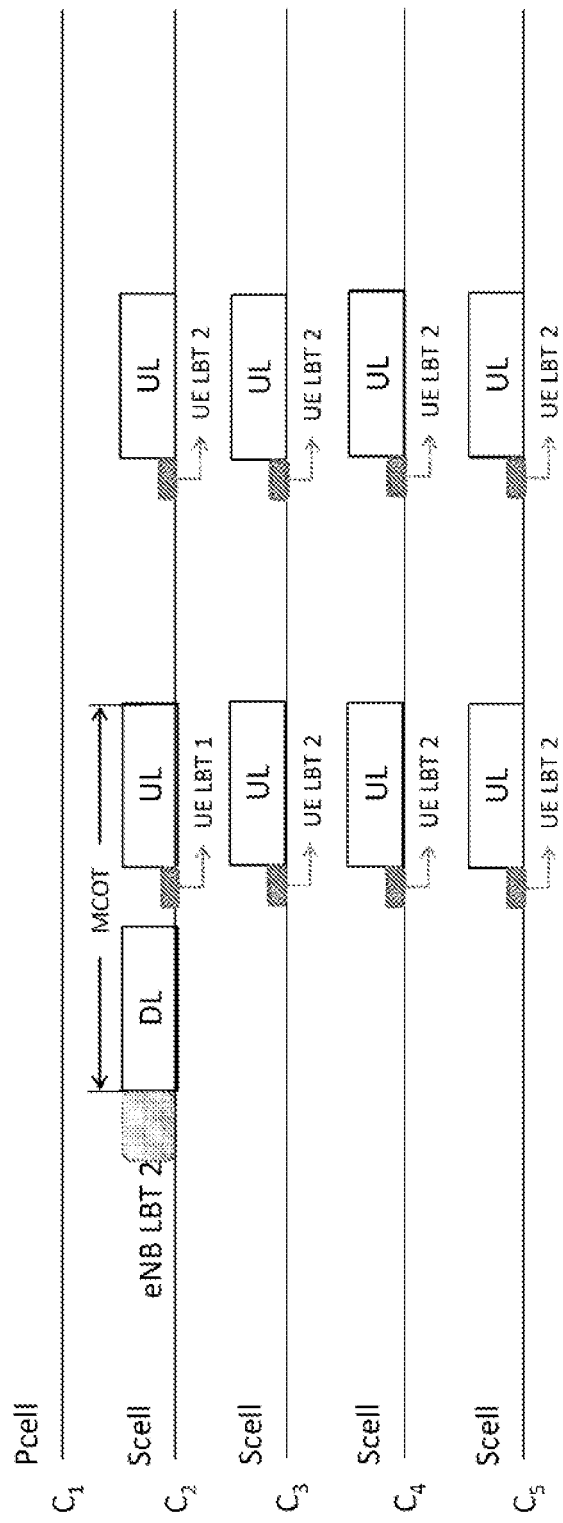
FIG. 12 is a schematic diagram showing an example of a result of a channel detection type configuration when a Type A multiple carrier operation is used.

FIG. 12 shows an example of a result of the channel detection type configuration when the multi-carrier operation of the type A is used.

As shown in FIG. 12, a carrier C1 is a primary service cell (Pcell), and carriers C2 to C5 are secondary service cells (Scell). On the carrier C2, firstly, the eNB performs LBT 2 (the second channel detection process). In a case of successful channel detection, the UE needs to perform the channel detection process before performing UL transmission.

As shown in FIG. 12, on the carrier C2, the UE may perform LBT1 (the first channel detection process) within the MCOT of the eNB. The UE performs LBT 2 (the second channel detection process) beyond the MCOT of the eNB. On other carriers C3, C4 and C5, the UE performs the LBT2 (the second channel detection process) independently.

According to another embodiment of the present disclosure, the setting unit 9111 may set one of multiple unlicensed carriers on the unlicensed channel as a primary channel, and set other unlicensed carriers as secondary channels. It may be seen from the above description that, the eNB selects Type B multiple carrier operation in the embodiment. In this case, the configuring unit 9112 may configure a channel detection type for the secondary channels to be the first channel detection process.

For the primary channel, in a case that uplink subframes carrying PUSCH transmission fall within the MCOT, the configuring unit 9112 may configure the channel detection type to be the first channel detection process.

In another aspect, for the primary channel, in a case that the uplink subframes carrying PUSCH transmission fall beyond the MCOT, the configuring unit 9113 may configure the channel detection type to be the second channel detection process.

According to the embodiment of the present disclosure, in a case that the eNB selects the Type B multiple carrier operation and the PUSCH of the UE is transmitted on the primary channel, the UE should perform the first channel detection process to reduce power consumption of the electronic device if the PUSCH transmission of the UE falls within the MCOT of the eNB. The UE Should perform the second channel detection process to ensure validity of the channel detection process if the PUSCH transmission of the UE falls beyond the MCOT of the eNB. In another aspect, if the PUSCH of the UE is transmitted on the secondary channels, the UE performs only the first channel detection process.

Based on the rule described above, the eNB can configure the type of the channel detection process performed by the UE on each configured carrier.

Figure 13:
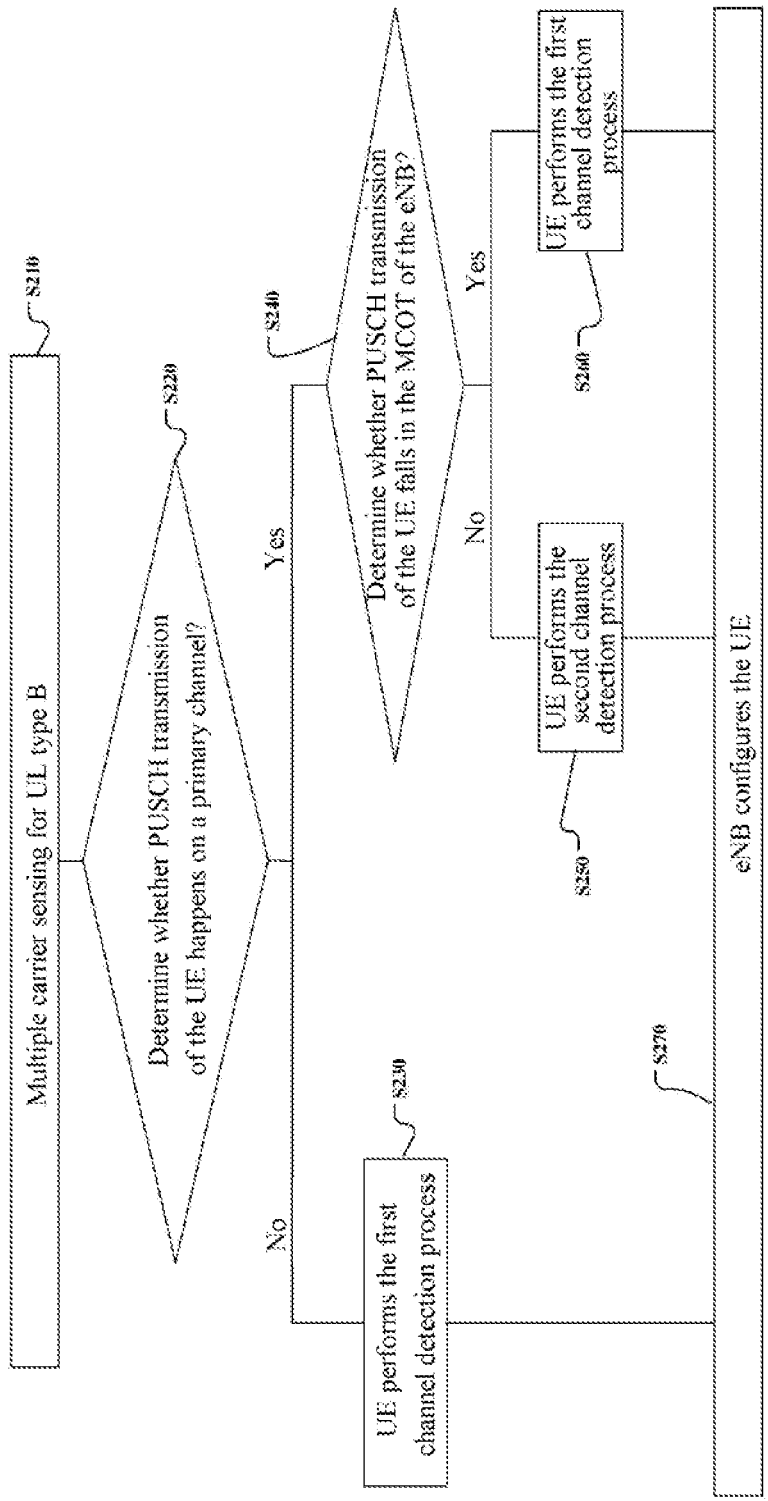
FIG. 13 is a flowchart showing a channel detection type configuration when a Type B multiple carrier operation is used.

FIG. 13 shows a flowchart of a channel detection type configuration when a Type B multiple carrier is used.

As shown in FIG. 13, in step S210, the eNB selects Type B multiple carrier sensing for UL.

Subsequently, in step S220, the eNB determines whether PUSCH of the UE is transmitted on the primary channel.

If the eNB determines that the PUSCH of the UE is not transmitted on the primary channel, the UE performs the first channel detection process in step S230.

In another aspect, if the eNB determines that the PUSCH of the UE is transmitted on the primary channel, the eNB determines whether the PUSCH transmission of the UE falls within the MCOT of the eNB in step S240.

If the eNB determines that the PUSCH transmission of the UE falls within the MCOT of the eNB, the UE performs the first channel detection process in step S260.

In another aspect, if the eNB determines that the PUSCH transmission of the UE falls beyond the MCOT of the eNB, the UE performs the second channel detection process in step S250.

Finally, in step S270, the eNB notifies the UE of a result of the channel detection type configuration, to configure the UE.

Figure 14:
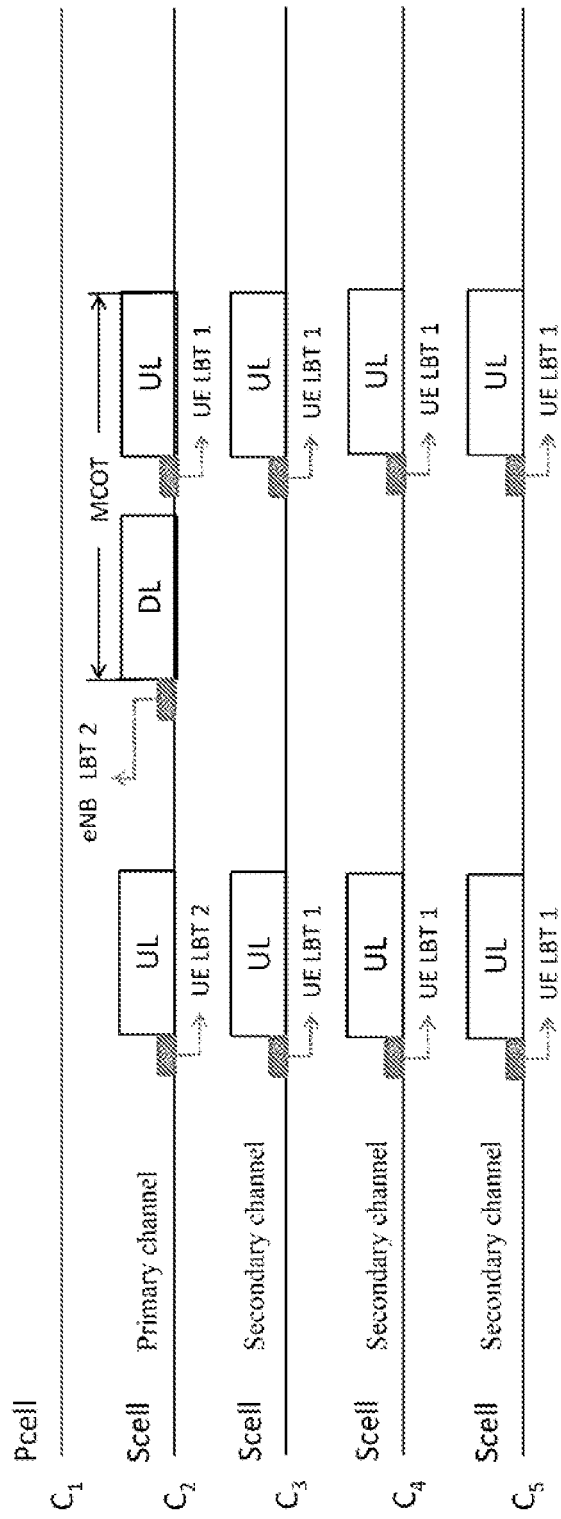
FIG. 14 is a schematic diagram showing an example of a result of a channel detection type configuration when a Type B multiple carrier operation is used.

FIG. 14 shows an example of a result of a channel detection type configuration when a multi-carrier operation of a type B is used.

As shown in FIG. 14, a carrier C1 is Pcell, and carriers C2 to C5 are Scells. Further, the carrier C2 is a primary channel, and carriers C3 to C5 are secondary channels.

As shown in FIG. 14, on the carrier C2, the UE may perform LBT 1 (the first channel detection process) within the MCOT of the eNB. The UE performs LBT 2 (the second channel detection process) beyond the MCOT of the eNB. On other carriers C3, C4 and C5, the UE only performs LBT 1 (the first channel detection process).

As described above, the eNB may indicate a channel detection type by reusing the DCI format IC. In other words, the adding unit 912 shown in FIG. 9 may reuse the DCI format IC, to add the generated configuration information to physical layer signaling.

Specifically, in the DCI format IC, bits b0b1b2 are used for Pcell, bits b3b4b5 are used for Scell1, bits b6b7b8 are used for Scell2, bits b9b10b11 are used for Scell3, and bits b12b13b14 used for Scell4. In addition, filling bits are further included.

Bits for Scell 1 to Scell 4 may be reused. As an example, if 3 bits for one of the Scell 1 to Scell 4 are "000", it is indicated to perform the second channel detection process. In another aspect, if 3 bits for one of the Scell 1 to Scell 4 are "111", it is indicated to perform the first channel detection process. In addition, it may be specified that the indications are valid for a predetermined time period (for example 6 ms).

An another example, for each of 3 bits for one of the Scell 1 to Scell 4, it may be specified that "0" indicates performing the second channel detection process and "1" indicates performing the first channel detection process. In addition, it may be further specified that the indications are valid for a predetermined time period (for example 2 ms). For example, if 3 bits for one of the Scell 1 to Scell 4 are "000", it is indicated that the second channel detection process is performed within three 2 ms. If the 3 bits for one of the Scell 1 to Scell 4 are "110", it is indicated that the first channel detection process is performed in first and second 2 ms, and the second channel detection process is performed in third 2 ms.

Figure 15:
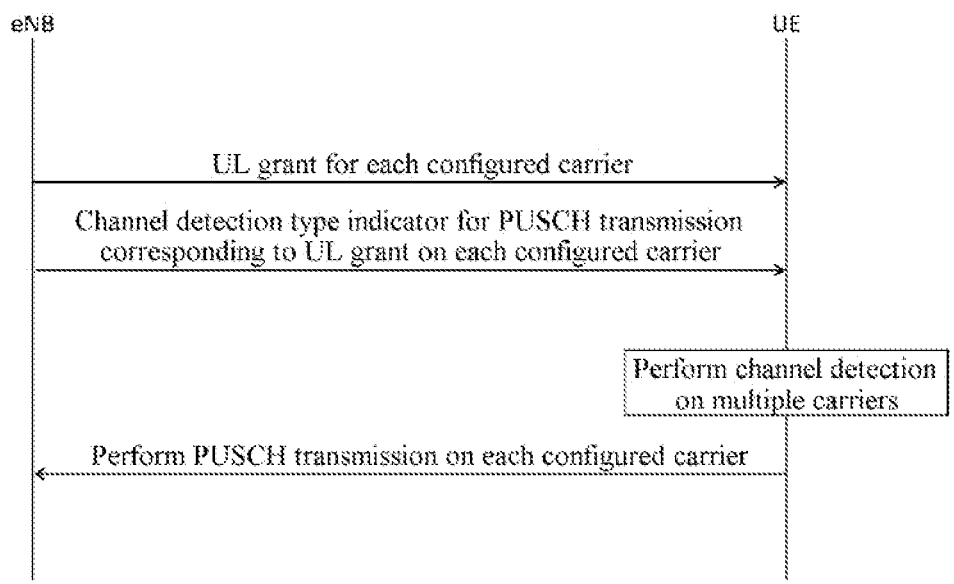
FIG. 15 is a flowchart showing a design of channel detection type indication signaling according to an embodiment of the present disclosure.

FIG. 15 shows a flowchart of designs of channel detection type indication signaling according to the embodiment of the present disclosure described above.

As shown in FIG. 15, firstly, the eNB transmits UL grant for each configured carrier to the UE.

Subsequently, the eNB transmits to the UE a channel detection type indication of PUSCH transmission on each configured carrier corresponding to the UL grant. Specifically, configuration information on the channel detection type may be generated according to the embodiment of the present disclosure, and the generated configuration information is added to physical layer signaling, to notify the UE.

Subsequently, based on the channel detection type indication transmitted by the eNB, the UE performs the channel detection process on multiple carriers.

Finally, in a case of successful channel detection, the UE transmits PUSCH to the eNB on each configured carrier.

Figure 16:
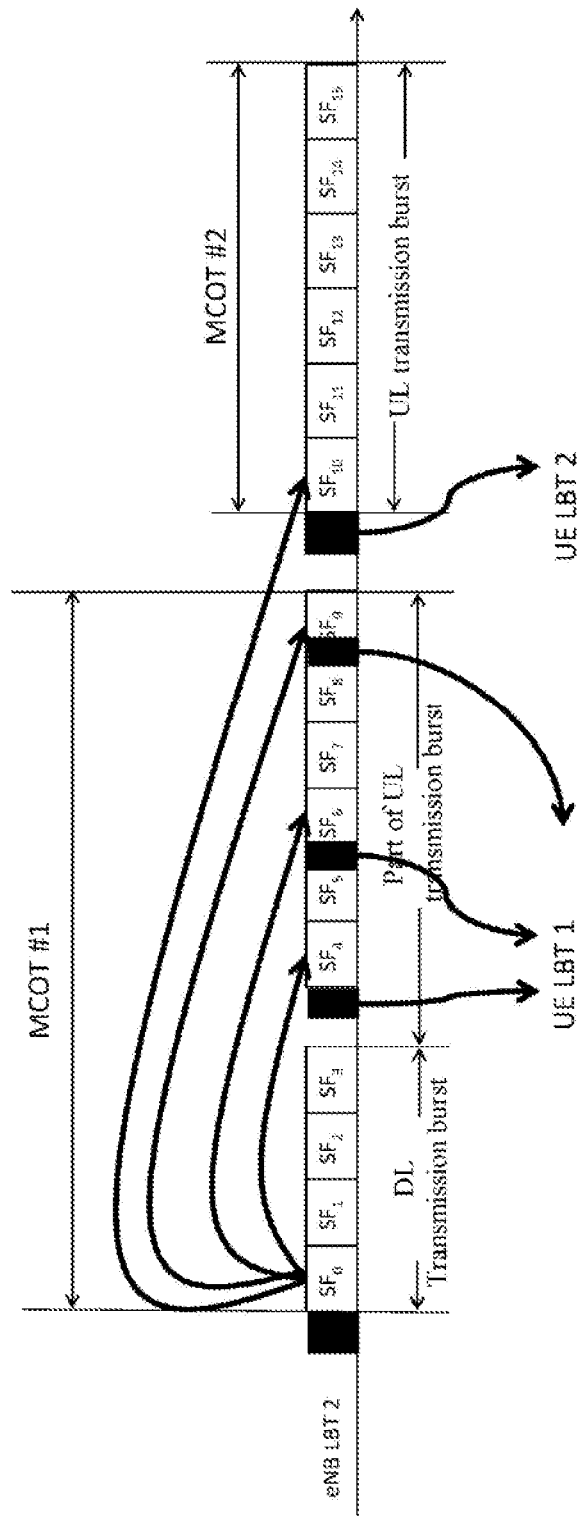
FIG. 16 is a schematic diagram showing a design of channel detection type indication signaling according to an embodiment of the present disclosure.

According to another embodiment of the present disclosure, the generation unit 911 shown in FIG. 9 may generate subframe boundary information as configuration information. The subframe boundary information may indicate a last subframe which falls within the MCOT after channel detection of a base station side in the wireless communication system is successful. FIG. 16 shows a schematic diagram of design of channel detection type indication signaling according to an embodiment of the present disclosure.

As shown in FIG. 16, the UE receives UL grant and knows that UL grant is valid for SF4, SF6, SF9 and SF10.

In addition, the UE also receives SF boundary information. Here, the SF boundary is SF9.

Therefore, the UE knows that SF4, SF6 and SF9 tall within the MCOT, therefore the UE performs the first channel detection process on these subframes. In another aspect, the UE knows that SF10 falls beyond the MCOT, therefore the UE performs the second channel detection process on the SF10.

For multiple carriers, the eNB may similarly notify the UE of a type of the multiple carrier channel sensing process (that is, the Type A or the Type B described above).

If the eNB selects the Type A, the eNB notify the SF boundary information on each configured carrier.

Figure 17:
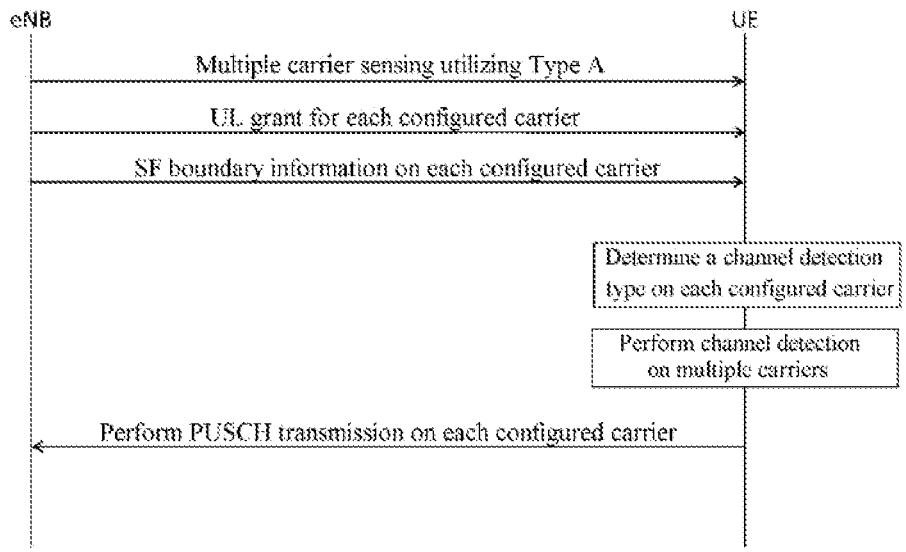
FIG. 17 is a flowchart showing a design of channel detection type indication signaling according to another embodiment of the present disclosure.

After the UE receives the SF boundary information, the UE performs the first channel detection process to access to unlicensed carriers if the UE determines that an identifier of an upcoming SF is less than or equal to the SF boundary. In another aspect, if the UE determines that the identifier of the upcoming SF is greater than the SF boundary, the UE performs the second channel detection process to access to the unlicensed carrier. In addition, if the UE does not receive SF boundary information, the UE may perform the second channel detection process to access to the unlicensed carrier. FIG. 17 shows a flowchart of design of channel detection type indication signaling according to the embodiment.

As shown in FIG. 17, firstly, the eNB transmits information on multiple carrier sensing utilizing Type A to the UE.

Subsequently, the eNB transmits UL grant for each configured carrier to the UE.

Then, the eNB may transmit SF boundary information on each configured carrier to the UE.

Subsequently, based on the received SF boundary information, the UE may determine a channel detection type on each configured carrier.

Subsequently, based on the determined channel detection type, the UE performs the channel detection process on multiple carriers.

Finally, in a case of successful channel detection, the UE transmits PUSCH to the eNB on each configured carrier.

In another aspect, if the eNB selects a Type B, the eNB may notify the UE of the SF boundary information for using by the primary channel.

Figure 18:
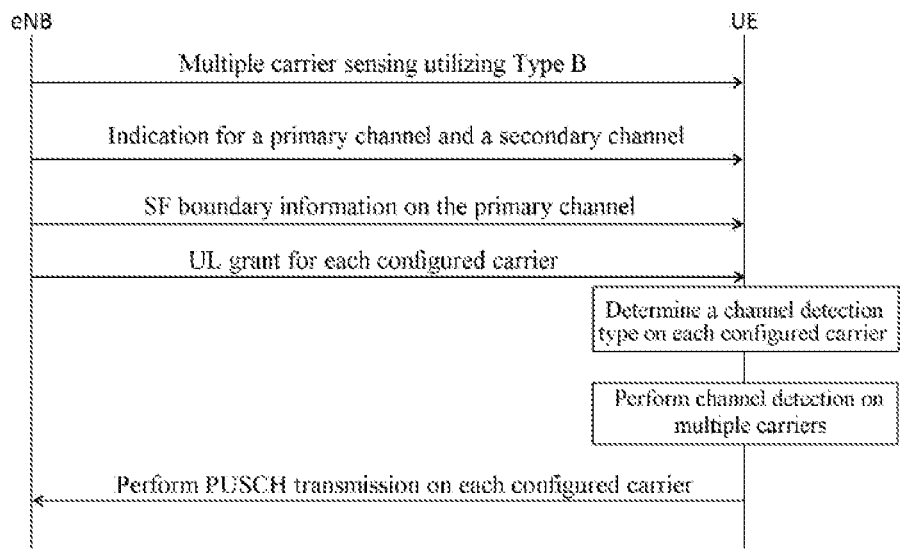
FIG. 18 is a flowchart showing a design of channel detection type indication signaling according to another embodiment of the present disclosure.

After the UE receives the SF boundary information, the UE performs the first channel detection process to access to the primary channel if the UE determines that an identifier of an upcoming SF is less than or equal to the SF boundary. In another aspect, the UE performs the second channel detection process to access to the primary channel if the UE determines that the identifier of the upcoming SF is greater than the SF boundary. In addition, if the UE does not receive SF boundary information, the UE may perform the second channel detection process to access to the primary channel. FIG. 18 shows a flowchart of design of channel detection type indication signaling according to the embodiment.

As shown in FIG. 18, firstly, the eNB transmits information on multiple carrier sensing utilizing Type B to the UE.

Subsequently, the eNB transmits information on indication of a primary channel and a secondary channel to the UE.

Then, the eNB may transmit SF boundary information on the primary channel to the UE.

Subsequently, the eNB transmits UL grant for each configured carrier to the UE.

Subsequently, based on the information on the indication of the primary channel and the secondary channel and the SF boundary information on the primary channel, the UE may determine a channel detection type on each configured carrier.

Subsequently, based on the determined channel detection type, the UE performs the channel detection process on multiple carriers.

Finally, in a case of successful channel detection, the UE transmits PUSCH to the eNB on each configured carrier.

Figure 19:
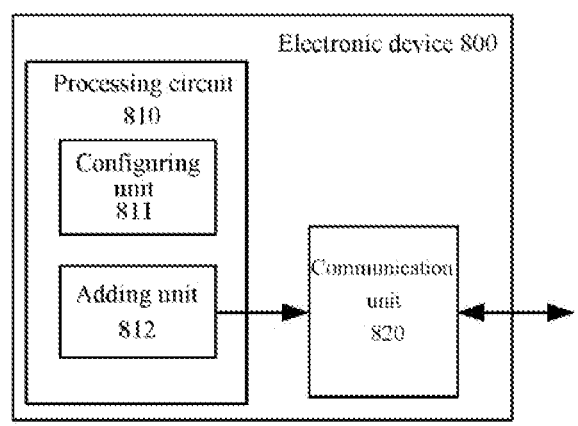
FIG. 19 is a block diagram showing a structure of an electronic device in a wireless communication system according to another embodiment of the present disclosure.

The design of the channel detection type indication signaling according to the embodiment of the present disclosure is described above. Subsequently, channel detection parameter design according to an embodiment of the present disclosure is described. FIG. 19 shows a structure of an electronic device 800 in a wireless communication system according to an embodiment of the present disclosure.

As shown in FIG. 19, the electronic device 800 may include a processing circuit 810. It should be noted that, the electronic device 800 may include one processing circuit 810 or multiple processing circuits 810. In addition, the electronic device 800 may further include a communication unit 820 as a transceiver and so on.

Further, the processing circuit 810 may include various discrete functional units to perform various different functions and/or operations. It should be noted that, the functional units may be physical entities or logical entities, and units with different names may be implemented by the same physical entity.

For example, as shown in FIG. 19, the processing circuit 810 may include a configuring unit 811 and an adding unit 812.

The configuring unit 811 may configure channel detection parameters for an unlicensed carrier on an unlicensed channel.

The adding unit 812 may add the configured channel detection parameter to physical layer signaling, to notify the UE.

With the electronic device 800 according to the embodiment of the present disclosure, the channel detection parameter configured for the unlicensed carrier on the unlicensed channel can be determined, thereby utilizing the unlicensed channel effectively.

According to the embodiment of the present disclosure, the channel detection parameter may be a size of a contention window used during an energy detection process including random backoff and a variable contention window size.

According to a preferred embodiment of the present disclosure, based on a result of preceding PUSCH transmission scheduled by the same uplink grant signaling, the configuring unit 811 may configure, for the unlicensed carrier, a channel detection parameter used when the UE performs a channel detection process before performing uplink transmission including PUSCH transmission scheduled by the same uplink grant signaling.

According to another preferred embodiment of the present disclosure, based on a result of preceding PUSCH transmission scheduled by uplink grant signaling carried by the same downlink subframe, the configuring unit 811 may configure, for the unlicensed carrier, a channel detection parameter used when the UE performs a channel detection process before performing uplink transmission including PUSCH transmission scheduled by the uplink grant signaling carried by the same downlink subframe.

Figure 20:
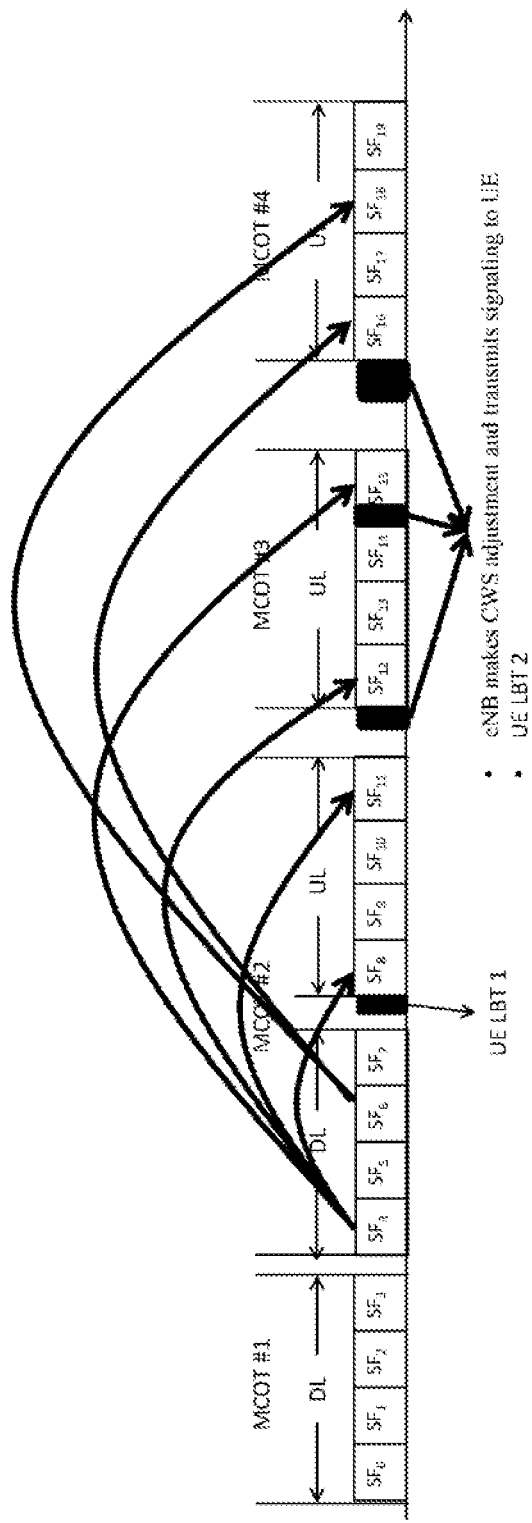
FIG. 20 is a schematic diagram showing channel detection parameter design according to an embodiment of the present disclosure.

Specifically, the eNB may perform CWS adjustment (that is the channel detection parameter configuration) based on certain PUSCH transmissions, the PUSCH transmissions share the same UL grant or use different UL grant transmitted in the same SF. If there is no PUSCH transmission mentioned above, the eNB may perform the CWS adjustment based on all preceding PUSCH transmissions. FIG. 20 shows a schematic diagram of channel detection parameter design according to the embodiment.

As shown in FIG. 20, according to the embodiment of the present disclosure, CWS before SF12 may be adjusted based on PUSCH transmission in SF8 and SF11, CWS before SF15 may be adjusted based on PUSCH transmission in SF8, SF11 and SF12, and CWS before SF16 may be adjusted based on PUSCH transmission in SF8, SF11, SF12 and SF15. For example, the CWS may be adjusted based on a success rate of the PUSCH transmission. Increasing of the number of NACKs as response to the PUSCH transmission indicates a lower success rate of the PUSCH transmission, therefore the CWS needs to be increased. On contrary, decreasing of the number of NACKs indicates a higher success rate of the PUSCH transmission, therefore the CWS needs to be decreased.

It should be noted that, according to the embodiment of the present disclosure, the wireless communication system may be an LAA system, and the electronic devices 400, 700, 800 and 900 may be base stations in the wireless communication system.

Subsequently, an electronic device 600 in a wireless communication system according to another embodiment of the present disclosure is described in conjunction with FIG. 21.

Figure 21:
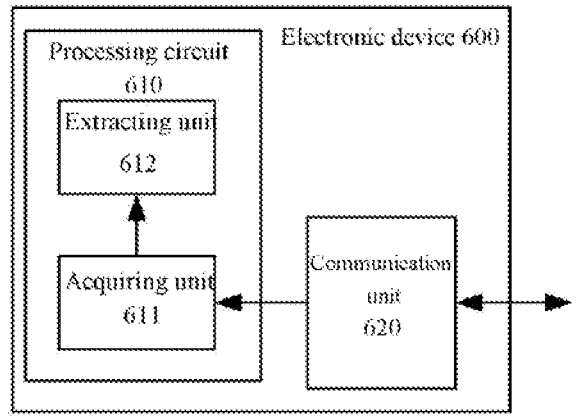
FIG. 21 is a block diagram showing a structure of an electronic device in a wireless communication system according to another embodiment of the present disclosure.

FIG. 21 shows a structure of the electronic device 600 in a wireless communication system according to another embodiment of the present disclosure.

As shown in FIG. 21, the electronic device 600 may include a processing circuit 610. It should be noted that, the electronic device 600 may include one processing circuit 610 or multiple processing circuits 610. In addition, the electronic device 600 may further include a communication unit. 620 such as a transceiver.

As mentioned above, similarly the processing circuit 610 may include various discrete functional units to perform various different functions and/or operations. The functional units may be physical entities or logical entities, and units with different names may be implemented by the same physical entity.

For example, as shown in FIG. 21, the processing circuit 610 may include an acquiring unit 611 and an extracting unit 612.

The acquiring unit 611 may acquire downlink signaling (for example physical layer signaling or MAC layer signaling) from a base station in the wireless communication system (for example via the communication unit 620).

The extracting unit 612 may extract, from the downlink signaling acquired by the acquiring unit 611, timing mapping information between a downlink subframe carrying uplink grant signaling and an uplink subframe carrying uplink transmission including PUSCH transmission performed on the unlicensed channel scheduled by the uplink grant signaling.

Preferably, the processing circuit 610 (for example the acquisition unit 611) may acquire one uplink grant signaling. Further, the processing circuit 610 (for example the extracting unit 612) may extract, from the uplink grant signaling, timing mapping information between one downlink subframe carrying the uplink grant signaling and multiple uplink subframes carrying uplink transmission including PUSCH transmission scheduled by the uplink grant signaling.

Preferably, the processing circuit 610 (for example the acquiring unit 611) may acquire multiple uplink grant signaling carried by the same downlink subframe. Further, the processing circuit 610 (for example the extracting unit 612) may extract, from each of the multiple uplink grant signaling, each piece of timing mapping information between the same downlink subframe and one uplink subframe carrying uplink transmission including PUSCH transmission scheduled by each of the multiple uplink grant signaling.

Preferably, the processing circuit 610 (for example a determining unit not shown) may determine one uplink grant signaling capable of scheduling PUSCH transmission carried by all uplink subframes before a next downlink subframe carrying next uplink grant signaling. Further, the processing circuit 610 (for example the extracting unit 612) may extract, from physical layer signaling or MAC layer signaling, actual timing mapping information between a downlink subframe carrying the uplink grant signaling and an uplink subframe actually carrying uplink transmission including PUSCH transmission scheduled by the uplink grant signaling, as the timing mapping information.

Preferably, based on the timing mapping information, the processing circuit 610 (for example a generation unit not shown) may further generate an instruction for performing uplink transmission including PUSCH transmission on the unlicensed channel.

Preferably, the processing circuit 610 (for example the extracting unit 612) may extract, from the physical layer signaling, configuration information on a channel detection type of a channel detection process performed before the uplink transmission including PUSCH transmission performed on the unlicensed channel. More preferably, the processing circuit 610 (for example the extracting unit 612) may extract the configuration information from the reused DCI format IC.

Preferably, the processing circuit 610 (for example the acquiring unit 611) may acquire subframe boundary information as configuration information. The subframe boundary information indicates a last subframe which falls within the MCOT after channel detection of a base station side in the wireless communication system is successful.

Preferably, based on the configuration information, the processing circuit 610 (for example a generation unit not shown) may generate an instruction for performing a first channel detection process or a second channel detection process before uplink transmission including PUSCH transmission performed on the unlicensed channel. As mentioned above, the first channel detection process may be an energy detection process excluding random backoff, and the second channel detection process may be an energy detection process including random backoff and a variable contention window size.

Preferably, the processing circuit 610 (for example the extracting unit 612) may extract a channel detection parameter from the physical layer signaling. Further, based on the extracted channel detection parameter, the processing circuit 610 (for example a configuring unit not shown) may configure a channel detection parameter for unlicensed carriers on an unlicensed channel. More preferably, the channel detection parameter may be a contention window size used during an energy detection process including random backoff and a variable contention window size.

It should be noted that, according to the embodiment of the present disclosure, the wireless communication system described above may be an LAA system, and the electronic device 600 may be a UE in the wireless communication system.

In summary, according to the embodiment of the present disclosure, a wireless communication system is provided, which includes a base station and a user equipment. The base station includes: a first transceiver; and one or more first processing circuits configured to perform operations of: configuring timing mapping information between a downlink subframe carrying uplink grant signaling and an uplink subframe carrying PUSCH transmission performed on an unlicensed channel by the user equipment scheduled by the uplink grant signaling; and causing the first transceiver to notify the user equipment of the timing mapping information. The user equipment includes: a second transceiver; and one or more second processing circuits configured to perform operations of: acquiring downlink signaling from the base station by the second transceiver; and extracting the timing mapping information from the downlink signaling.

Figure 22:
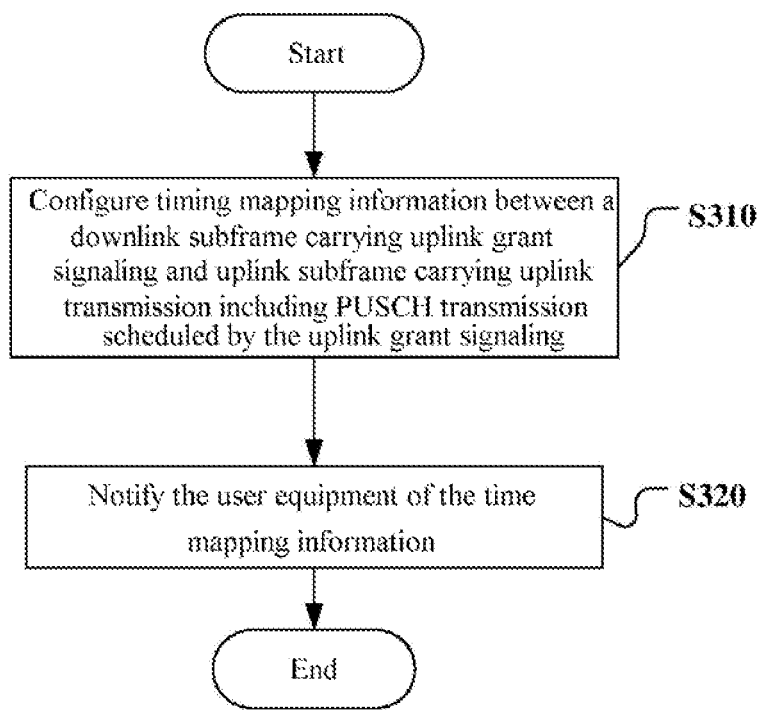
FIG. 22 is a flowchart showing a wireless communication method according to an embodiment of the present disclosure.

Subsequently, a method for performing wireless communication in a wireless communication system according to an embodiment of the present disclosure is described in conjunction with FIG. 22. FIG. 22 shows a flowchart of a wireless communication method according to an embodiment of the present disclosure.

As shown in FIG. 22, firstly, in step S310, timing mapping information between a downlink subframe catering uplink grant signaling and uplink subframe carrying uplink transmission including PUSCH transmission performed on an unlicensed channel by a user equipment in a wireless communication system scheduled by the uplink grant signaling.

Then, in step S320, the timing mapping information is notified to the user equipment.

Preferably, when configuring the timing mapping information one downlink subframe carrying one uplink giant signaling may be mapped to multiple uplink subframes carrying uplink transmission including the PUSCH transmission scheduled by the uplink grant signaling, and the timing mapping information may be added into the uplink grant signaling.

Preferably, the downlink subframe may carry multiple uplink grant signaling. In this case, each piece of timing mapping information between a downlink subframe carrying each of the multiple uplink grant signaling and one uplink subframe carrying uplink transmission including PUSCH transmission scheduled by each of the multiple uplink grant signaling. Further, each piece of timing mapping information may be added into each of the multiple uplink grant signaling, to notify the user equipment.

Preferably, one uplink grant signaling may be set to be capable of scheduling uplink transmission including PUSCH transmission carried by all uplink subframes before a next downlink subframe carrying next uplink grant signaling. Further, actual timing mapping information between a downlink subframe carrying one uplink grant signaling and uplink subframes actually carrying uplink transmission including PUSCH transmission scheduled by the uplink grant signaling. The actual timing mapping information may be added into physical layer signaling or MAC layer signaling, to notify the user equipment.

Preferably, according to the method in the embodiment of the present disclosure, configuration information on a channel detection type of a channel detection process performed by the user equipment before performing uplink transmission including PUSCH transmission on the unlicensed channel may be generated. Further, the generated configuration information may be added into the physical layer signaling, to notify the user equipment.

Preferably, when generating the configuration information, multiple unlicensed carries on the unlicensed channel may be set to be independent from each other. For each of the multiple unlicensed carriers, the channel detection type may be configured to be a first channel detection process when an uplink subframe carrying uplink transmission including PUSCH transmission falls within the MCOT. The channel detection type may be configured to be a second channel detection process when the uplink subframe carrying uplink transmission including PUSCH transmission falls beyond the MCOT.

Preferably, when generating the configuration information, one of the multiple unlicensed carriers on the unlicensed channel may be set as a primary channel, and other unlicensed carriers may be set as secondary channels. In this case, a channel detection type for the secondary channels may be configured to be the first channel detection process. For the primary channel, when an uplink subframe carrying uplink transmission including PUSCH transmission fills within the MCOT, the channel detection type may be configured to be the first channel detection process, while when the uplink subframe carrying uplink transmission including PUSCH transmission falls beyond the MCOT, the channel detection type may be configured to be the second channel detection process. As mentioned above, the first channel detection process is an energy detection process excluding random backoff, and the second channel detection process is an energy detection process including random backoff and a variable contention window size.

Preferably, DCI format IC may be reused to add the generated configuration information into physical layer signaling.

Preferably, subframe boundary information may be generated as configuration information. The subframe boundary information indicates a last subframe which falls within the MCOT after channel detection of a base station side in the wireless communication system is successful.

Preferably, according to the method in the embodiment of the present disclosure, a channel detection parameter may be configured for the unlicensed carrier on the unlicensed channel. Further, the configured channel detection parameter may be added into physical layer signaling, to notify the user equipment.

Preferably, based on a result of preceding uplink transmission including PUSCH transmission scheduled by a same uplink grant signaling, a channel detection parameter used when the user equipment performs a channel detection process before performing uplink transmission including PUSCH transmission scheduled by the same uplink grant signaling, may be configured for the unlicensed carrier.

Preferably, based on a result of preceding uplink transmission including PUSCH transmission scheduled by uplink grant signaling carried by a same downlink subframe, a channel detection parameter used when the user equipment performs a channel detection process before performing uplink transmission including PUSCH transmission scheduled by uplink grant signaling carried by the same downlink subframe, may be configured for the unlicensed carrier.

Figure 23:
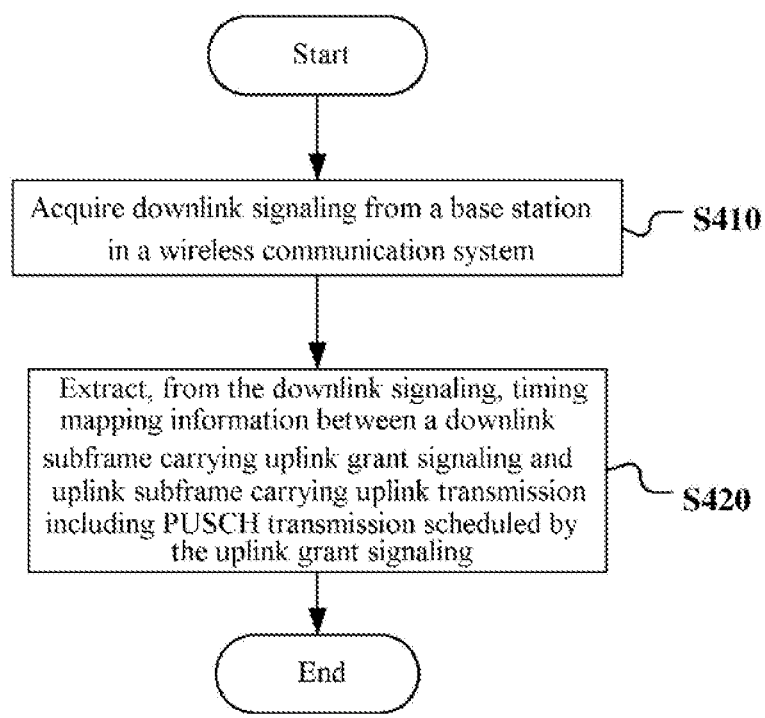
FIG. 23 is a flowchart showing a wireless communication method according to another embodiment of the present disclosure.

Subsequently, a method for performing wireless communication in a wireless communication system according to another embodiment of the present disclosure is described with reference to FIG. 23. FIG. 23 shows a flowchart of a wireless communication method according to another embodiment of the present disclosure.

As shown in FIG. 23, firstly, in step S410, downlink signaling (for example, physical layer signaling or MAC layer signaling) from a base station in a wireless communication system is acquired.

Then, in step S420, timing mapping information between a downlink subframe carrying uplink grant signaling and uplink subframe carrying uplink transmission including PUSCH transmission performed on an unlicensed channel scheduled by the uplink grant signaling, is extracted from the physical layer signaling or the MAC layer signaling.

Preferably, one uplink grant signaling may be acquired. Further, timing mapping information between one downlink subframe carrying the uplink grant signaling and multiple uplink subframes carrying uplink transmission including PUSCH transmission scheduled by the uplink grant signaling, may be extracted from the one uplink grant signaling.

Preferably, multiple uplink grant signaling carried by the same downlink subframe may be acquired. Further, from each of the multiple uplink grant signaling, each piece of timing mapping information between the same downlink subframe and one uplink subframe carrying uplink transmission including PUSCH transmission scheduled by each of the multiple uplink grant signaling may be extracted.

Preferably, it may be determined that one uplink grant signaling is capable of scheduling uplink transmission including PUSCH transmission carried by all uplink subframes before a next downlink subframe carrying next uplink grant signaling. Further, actual timing mapping information between a downlink subframe carrying the uplink grant signaling and an uplink subframe actually carrying uplink transmission including PUSCH transmission scheduled by the uplink grant signaling, may be extracted from the physical layer signaling or the MAC layer signaling, as the timing mapping information.

Preferably, based on the timing mapping information, an instruction for performing uplink transmission including PUSCH transmission on the unlicensed channel may be generated.

Preferably, according to the method in the embodiment of the present disclosure, configuration information on a channel detection type of a channel detection process performed before the uplink transmission including PUSCH transmission performed on the unlicensed channel, may be extracted from the physical layer signaling. More preferably, configuration information may be extracted from the reused DCI format 1C.

Preferably, subframe boundary information may be acquired as configuration information. The subframe boundary information indicates a last subframe which falls within the MCOT after channel detection of a base station side in the wireless communication system is successful.

Preferably, based on the configuration information, an instruction for performing the first channel detection process or the second channel detection process before the uplink transmission including PUSCH transmission performed on the unlicensed channel may be generated. The first channel detection process is an energy detection process excluding random backoff, and the second channel detection process is an energy detection process including random backoff and a variable contention window size.

Preferably, according to the method in the embodiment of the present disclosure, a channel detection parameter may be extracted from the physical layer signaling. Further, based on the extracted channel detection parameter, a channel detection parameter may be configured for unlicensed carriers on the unlicensed channel.

Specific implementations of steps of the method for performing wireless communication in the wireless communication system according to the embodiments of the present disclosure are described in detail above, which are not repeated here.

The technology according to the present disclosure may be applied to various types of products. For example, the base station mentioned in the present disclosure may be implemented as any type of evolution Node B (eNB), such as a macro eNB and a small eNB. The small eNB may be an eNB of a cell with a coverage less than that of a macro cell, such as a pico-eNB, a micro-eNB and a household (femto) eNB. Alternatively, the base station may be implemented as any other types of base stations, such as a NodeB and a base transceiver station (BTS). The base station may include: a body configured to control wireless communication (also referred to as a base station device); and one or more remote radio head-ends (RRHs) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet personal computer (PC), a notebook PC, a portable game terminal and a portable/dongle mobile router and a digital camera) or a vehicle-mounted terminal (such as an automobile navigation device). The UE may be further implemented as a terminal performing machine to machine (M2M) communication (also referred to as a MTC terminal). In addition, the UE may be a wireless communication module installed on each of the above terminals (such as an integrated circuit module including a single wafer).

Figure 24:
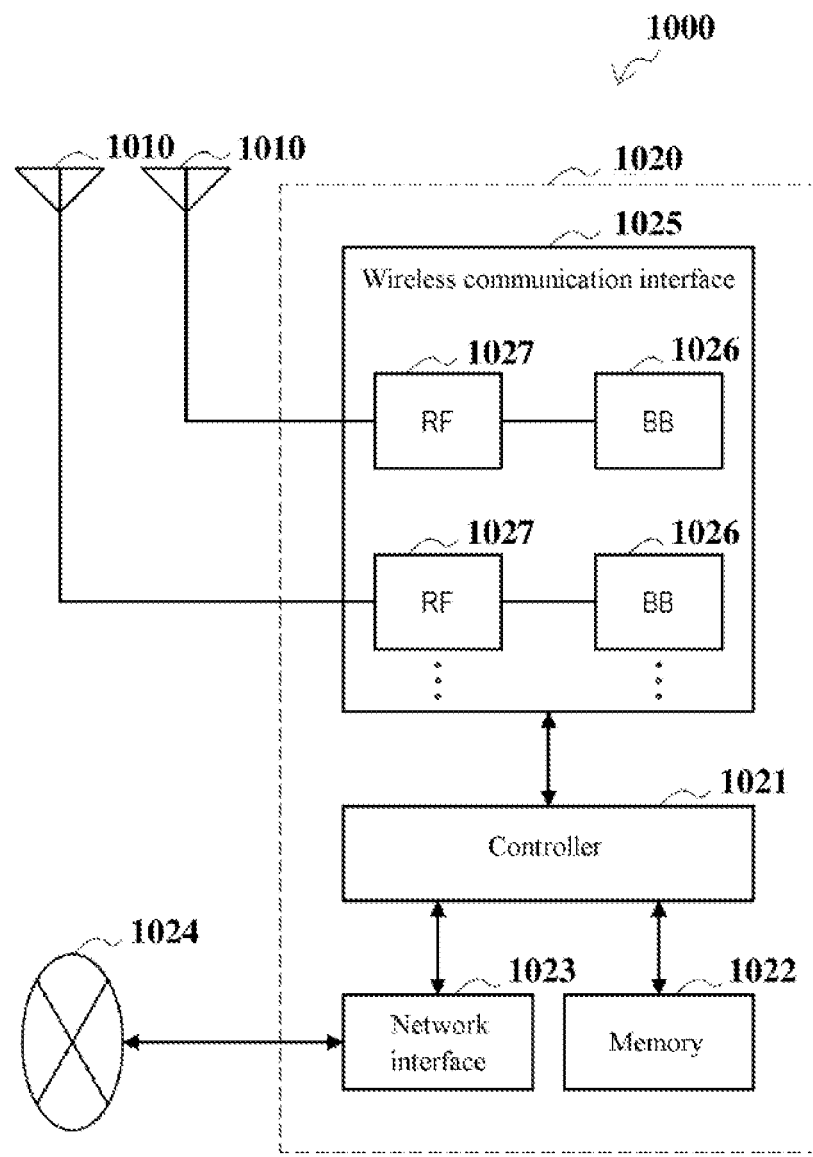
FIG. 24 is a block diagram showing a first example of a schematic configuration adapting to an evolution Node Base (eNB) Station according to the present disclosure.

FIG. 24 is a block diagram showing a first example of a schematic configuration of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a multiple-input multiple-output (MIMO) antenna) and is used for the base station device 1020 to transmit and receive a wireless signal. As shown in FIG. 24, the eNB 1000 may include multiple antennas 1010. For example, the multiple antennas 1010 may be compatible with multiple frequency bands used by the eNB 1000. Although FIG. 24 shows an example in which the eNB 1000 includes multiple antennas 1010, the eNB 1000 may include a single antenna 1010.

The base station device 1020 includes a controller 1021, a memory 1022, a network interface 1023 and a wireless communication interface 1025.

The controller 1021 may be a CPU or DSP for example and controls various types of functions of higher layers of the base station device 1020. For example, the controller 1021 generates a data packet according to data in a signal processed by the wireless communication interface 1025, and transfers the generated packet via the network interface 1023. The controller 1021 may bundle data from multiple baseband processors to generate a bundle packet and transfers the generated bundle packet. The controller 1021 may have logic functions to perform the following control: such as wireless resource control, wireless bearer control, mobility management, admission control and schedule. The control may be implemented in conjunction with an eNB or a core network node nearby. The memory 1022 includes an RAM and an ROM and stores programs performed by the controller 1021 and various types of control data (such as a terminal list, transmission power data and schedule data).

The network interface 1023 is a communication interface connecting a base station device 1020 to a core network 1024. The controller 1021 may communicate with a core network node or another eNB via the network interface 1023. In this case, the eNB 1000 may be connected to the core network node or other eNB via a logic interface (such as an S1 interface and an X2 interface). The network interface 1023 may also be a wired communication interface or a wireless communication interface for a wireless backhaul line. If the network interface 1023 is a wireless communication interface, the network interface 1023 may use a higher frequency band for wireless communication as compared with a frequency band used by the wireless communication interface 1025.

The wireless communication interface 1025 supports any cellular communication scheme (such as Long Term Evolution (LTE) and LTE-advanced), and provide wireless connection to a terminal in a cell of the eNB 1000 via an antenna 1010. The wireless communication interface 1025 may generally include a baseband (BB) processor 1026 and an RF circuit 1027. The BB processor 1026 may perform for example encoding/decoding modulating/demodulating and multiplexing and de-multiplexing and perform various types of signal processing of layers (such as L1, medium access control (MAC), radio link control (RLC) and packet data convergence protocol (PDCP). Instead of a controller 1021, the BB processor 1026 may have a part or all of the logic functions described above. The BB processor 1026 may be a memory storing communication control programs, or a module including a processor configured to perform programs and related circuits. Updating programs may change functions of the BB processor 1026. The module may be a card or a blade inserted to a slot of the base station device 1020. Alternatively, the module may also be a chip installed on the card or the blade. Meanwhile, an RF circuit 1027 may include for example a mixer, a filter and an amplifier, and transmits and receives a wireless signal via the antenna 1010.

As shown in FIG. 24, the wireless communication interface 1025 may include multiple BB processors 1026. For example, the multiple BB processors 1026 may be compatible with multiple frequency bands used by the eNB 1000. As shown in FIG. 24, the wireless communication interface 1025 may include multiple RF circuits 1027. For example, the multiple RF circuits 1027 may be compatible with multiple antenna elements. Although FIG. 24 shows an example in which the wireless communication interface 1025 includes multiple BB processors 1026 and multiple RF circuits 1027, the wireless communication interface 1025 may include a single BB processor 1026 or a single RF circuit 1027.

Figure 25:
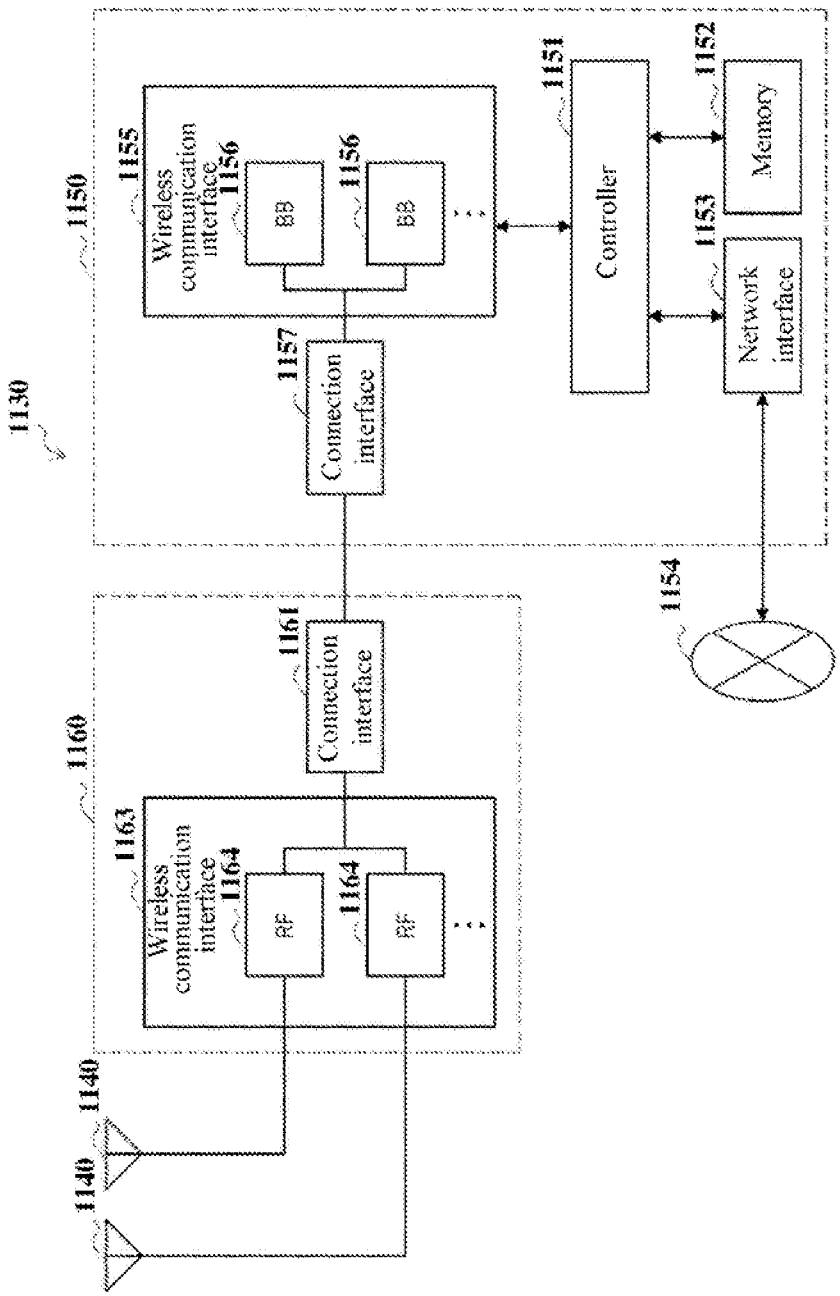
FIG. 25 is a block diagram showing a second example of the schematic configuration adapting to the eNB according to the present disclosure.

FIG. 25 is a block diagram showing a second example of the schematic configuration of the eNB to which the technology of the present disclosure may be applied. An eNB 1130 includes one or more antennas 1140, a base station device 1150 and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in the MIMO antenna) and is used for the RRH 1160 to transmit and receive a wireless signal. As shown in FIG. 25, the eNB 1130 may include multiple antennas 1140. For example, the multiple antennas 1140 may be compatible with multiple frequency bands used by the eNB 1130. Although FIG. 25 shows an example in which the eNB 1130 includes multiple antennas 1140, the eNB 1130 may include a single antenna 1140.

The base station device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 described with reference to FIG. 24.

A wireless communication interface 1155 supports any cellular communication scheme (such as LTE and LTE-advanced), and provide wireless communication with a terminal in a sector corresponding to the RRH 1160 via the RRH 1160 and the antenna 1140. The wireless communication interface 1155 may generally include a BB processor 1156 for example. In addition to that the BB processor 1156 is connected to an RF circuit 1164 of the RRH 1160 via the connection interface 1157, the BB processor 1156 is the same as the BB processor 1026 described with reference to FIG. 24. As shown in FIG. 25, the wireless communication interface 1155 may include multiple BB processors 1156. For example, the multiple BB processors 1156 may be compatible with multiple frequency bands used by the eNB 1130. Although FIG. 25 shows an example in which the wireless communication interface 1155 includes multiple BB processors 1156, the wireless communication interface 1155 may include a single BB processor 1156.

The connection interface 1157 is an interface configured to connect the base station device 1150 (the wireless communication interface 1155) to the RRH 1160. The connection interface 1157 may be a communication module for communication in the high speed line described above which connects the base station device 1150 (the wireless communication interface 1155) to the RRH 1160.

The RRH 1160 includes a connection interface 1161 and a wireless communication interface 1163.

The connection interface 1161 is an interface configured to connect the RRH 1160 (the wireless communication interface 1163) to the base station device 1150. The connection interface 1161 may be a communication module for performing communication via the high speed line described above.

The wireless communication interface 1163 transmits and receives a wireless signal via the antenna 1140. The wireless communication interface 1163 may generally include an RF circuit 1164 for example. The RF circuit 1164 may include for example a mixer, a filter and an amplifier, and transmits and receives a wireless signal via the antenna 1140. As shown in FIG. 25, the wireless communication interface 1163 may include multiple RF circuits 1164. For example, the multiple RF circuits 1164 may support multiple antenna elements. Although FIG. 25 shows an example in which the wireless communication interface 1163 includes multiple RF circuits 1164, the wireless communication interface 1163 may include a single RF circuit 1164.

In the eNB 1000 and the eNB 1130 shown in FIG. 24 and FIG. 25, the processing circuit 410 described with reference to FIG. 4 and the configuring unit 411 and the adding unit 412 in the processing circuit 410, the processing circuit 710 described with reference to FIG. 7 and the setting unit 711, the configuring unit 712 and the adding unit 713 in the processing circuit 710, the processing circuit 910 described with reference to FIG. 9 and the generation unit 911 and the adding unit 912 in the processing circuit 910, and the processing circuit 810 described with reference to FIG. 19 and the configuring unit 811 and the adding unit 812 in the processing circuit 810, may be implemented by the controller 1021 and/or the controller 1151. The communication unit 420 described with reference to FIG. 4, the communication unit 720 described with reference to FIG. 7, the communication unit 920 described with reference to FIG. 9 and the communication unit 820 described with reference to FIG. 19, may be implemented by the wireless communication interface 1025 and the wireless communication interface 1155 and/or the wireless communication interface 1163. At least a part of functions may be implemented by the controller 1021 and the controller 1151. For example, the controller 1021 and/or the controller 1151 may perform the configuration function and the adding function by executing instructions stored in the corresponding memory.

Figure 26:
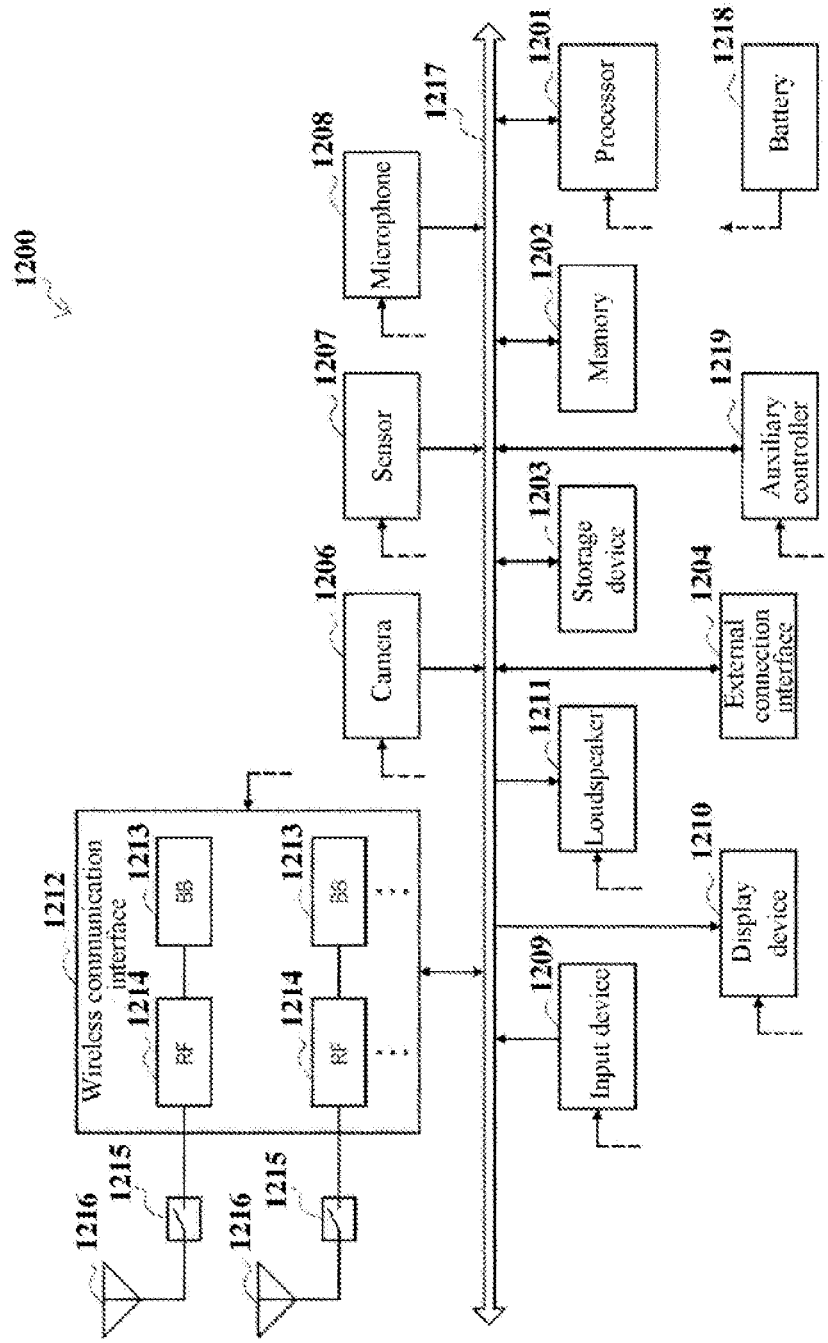
FIG. 26 is a block diagram showing an example of a schematic configuration adapting to a smart phone according to the present disclosure.

FIG. 26 is a block diagram showing an example of a schematic configuration of a smart phone 1200 to which the technology of the present disclosure may be applied. The smart phone 1200 includes: a processor 1201, a memory 1202, a storage apparatus 1203, an external connection interface 1204, a camera 1206, a sensor 1207, a microphone 1208, an input apparatus 1209, a display apparatus 1210, a loudspeaker 1211, a wireless communication interface 1212, one or more antenna switches 1215, one or more antennas 1216, a bus 1217, a battery 1218 and an auxiliary controller 1219.

The processor 1201 may be for example a CPU Or a system on chip (SoC), and control functions of an application layer and other layers of the smart phone 1200. The memory 1202 includes an RAM and an ROM, and stores programs executed by the processor 1201 and data. The storage apparatus 1203 may include a storage medium, such as a semiconductor memory and a hard disk. The external connection interface 1204 is an interface configured to connect an external apparatus (such as a memory card and a universal serial bus (USB) device) to the smart phone 1200.

The camera 1206 includes an image sensor (such as a charge coupled device (CCD) and a complementary metal oxide semiconductor (CMOS)) and generates a captured image. The sensor 1207 may include a set of sensors, such as a measurement sensor, a gyroscope sensor, a geomagnetic sensor and an acceleration sensor. The microphone 1208 converts sound inputted into the smart phone 1200 into an audio signal. The input apparatus 1209 includes for example a touch sensor configured to detect touch on a screen of the display apparatus 1210, a keypad, a keyboard, a button or a switch, and receives an operation or information inputted from a user. The display apparatus 1210 includes a screen (such as a liquid crystal display (LCD) and an organic light emitting diode (OLED) display), and displays an output image of the smart phone 1200. The loudspeaker 1211 converts the audio signal outputted from the smart phone 1200 into sound.

The wireless communication interface 1212 supports any cellular communication scheme (such as LTE and LTE-advanced), and performs wireless communication. The wireless communication interface 1212 may generally include for example a BB processor 1213 and an RF circuit 1214. The BB processor 1213 may perform encoding/decoding, modulating/demodulating and multiplexing/de-multiplexing for example, and perform various types of signal processing for wireless communication. Meanwhile, the RF circuit 1214 may include for example a mixer, a filter and an amplifier, and transmits and receives a wireless signal via an antenna 1216. The wireless communication interface 1212 may be a chip module on which a BB processor 1213 and the RF circuit 1214 are integrated. As shown in FIG. 26, the wireless communication interface 1212 may include multiple BB processors 1213 and multiple RF circuits 1214. Although FIG. 26 shows an example in which the wireless communication interface 1212 includes multiple BB processors 1213 and multiple RF circuits 1214, the wireless communication interface 1212 may include a single BB processor 1213 or a single RF circuit 1214.

In addition to the cellular communication scheme, the wireless communication interface 1212 may support other types of wireless communication schemes, such as a short distance wireless communication scheme, a near field communication scheme and a wireless local area network (LAN) scheme. In this case, the wireless communication interface 1212 may include a BB processor 1213 and an RF circuit 1214 for each type of wireless communication scheme.

Each of the wireless switches 1215 switches a connection destination of the antenna 1216 between multiple circuits (for example circuits for different wireless communication schemes) included in the wireless communication interface 1212.

Each of the antennas 1216 includes a single or multiple antenna elements (such as multiple antenna elements included in the MIMO antenna), and is used for the wireless communication interface 1212 to transmit and receive a wireless signal. As shown in FIG. 26, the smart phone 1200 may include multiple antennas 1216. Although FIG. 26 shows an example in which the smart phone 1200 includes multiple antennas 1216, the smart phone 1200 may include a single antenna 1216.

In addition, the smart phone 1200 may include an antenna 1216 for each type of wireless communication scheme. In this case, the antenna switch 1215 may be omitted from the configuration of the smart phone 1200.

The bus 1217 connects the processor 1201, the memory 1202, the storage apparatus 1203, the external connection interface 1204, the camera 1206, the sensor 1207, the microphone 1208, the input apparatus 1209, the display apparatus 1210, the loudspeaker 1211, the wireless communication interface 1212 and the auxiliary controller 1219 with each other. The battery 1218 supplies power for blocks in the smart phone 1200 shown in FIG. 26 via a feeder which is indicated partially as a dashed line in the figure. The auxiliary controller 1219 controls a minimum necessary function of the smart phone 1200 in a sleeping, mode, for example.

In the smart phone 1200 shown in FIG. 26, the processing circuit 610 described with reference to FIG. 21 and the acquiring unit 611 and the extracting unit 612 in the processing circuit 610 may be implemented by the processor 1201 or the auxiliary controller 1219. The communication unit 630 described with reference to FIG. 21 may be implemented by the wireless communication interface 1212. At least a part of the functions may be implemented by the processor 1201 or the auxiliary controller 1219. For example, the processor 1201 or the auxiliary controller 1219 may perform the information acquisition function and the information extraction function by executing instructions stored in the memory 1202 or the storage apparatus 1203.

Figure 27:
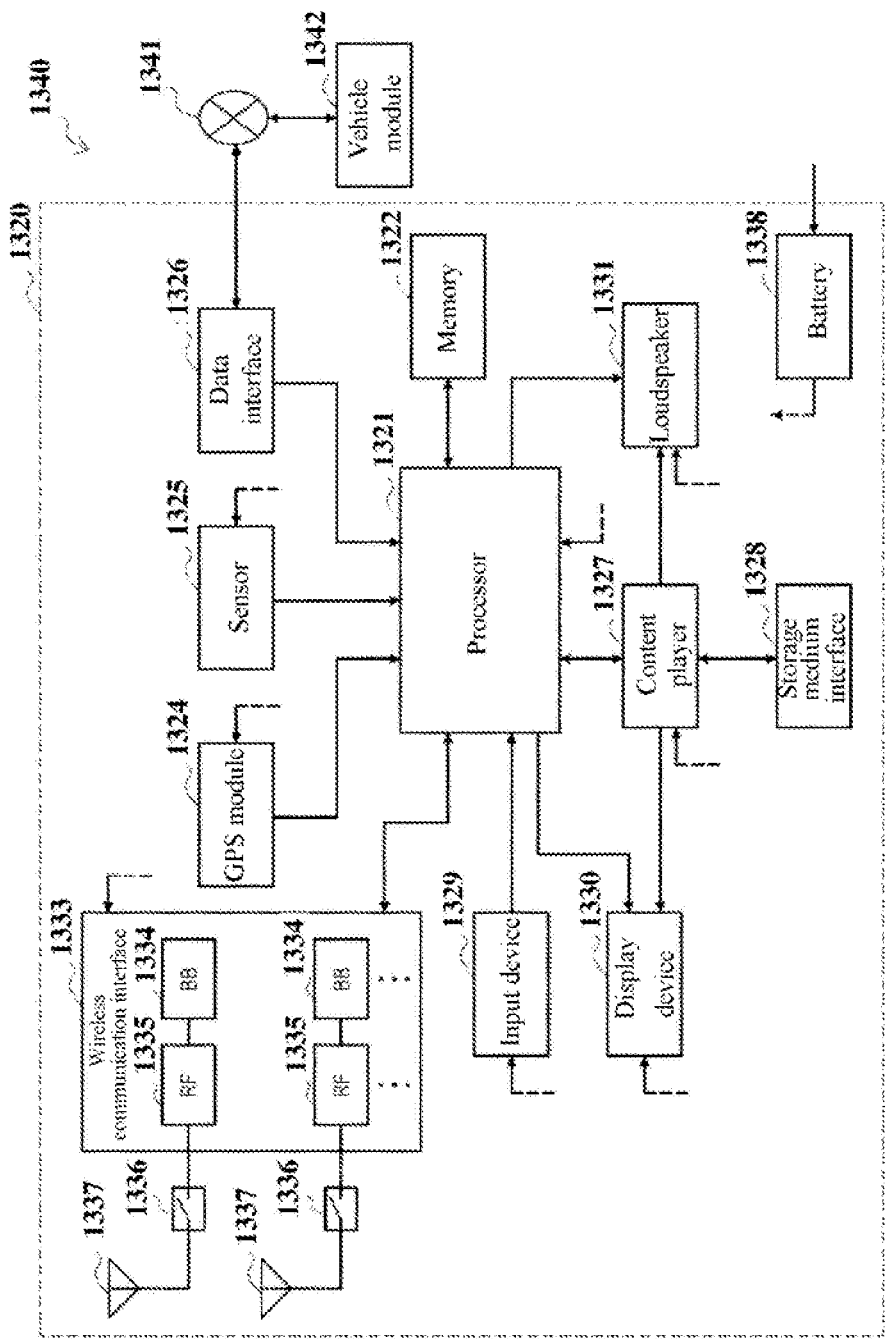
FIG. 27 is a block diagram showing an example of a schematic configuration adapting to an automobile navigation device according to the present disclosure.

FIG. 27 is a block diagram showing an example of a schematic configuration of an automobile navigation device 1320 to which the technology of the present disclosure may be applied. The automobile navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a loudspeaker 1331, a wireless communication interface 1333, one or more antenna switches 1336, one or more antennas 1337 and a battery 1338.

The processor 1321 may be a CPU or an SoC, and controls a navigation function and other functions of the automobile navigation device 1320. The memory 1322 includes an RAM and an ROM, and stores programs executed by the processor 1321 and data.

The GPS module 1324 measures a position of the automobile navigation device 1320 (such as a latitude, a longitude and a height) by using a GPS signal received from a GPS satellite. The sensor 1325 may include a set of sensors, such as a gyroscope sensor, a geomagnetic sensor and an air pressure sensor. The data interface 1326 is connected to a vehicle network 1341 for example through a terminal not shown, and acquires data generated by the vehicle (such as vehicle speed data).

The content player 1327 reproduces contents stored in a storage medium (such as a CD and a DVD), and the storage medium is inserted into the storage medium interface 1328. The input apparatus 1329 includes for example a touch sensor configured to detect touch on a screen of the display apparatus 1330, a button or a switch, and receives an operation or information inputted from a user. The display apparatus 1330 includes a screen of an LCD or OLED display for example, and displays an image with a navigation function or the reproduced content. The loudspeaker 1331 outputs a sound with a navigation function or the reproduced content.

The wireless communication interface 1333 supports any cellular communication scheme (such as LTE and LTE-advanced), and performs wireless communication. The wireless communication interface 1333 may generally include a BB processor 1334 and an RF circuit 1335 for example. The BB processor 1334 may perform encoding/decoding modulating/demodulating and multiplexing/de-multiplexing, and perform various types of signal processing for wireless communication. Meanwhile, the RF circuit 1335 may include for example a mixer, a filter and an amplifier, and transmits and receives a wireless signal via the antenna 1337. The wireless communication interface 1333 may also be a chip module on which the BB processor 1334 and the RF circuit 1335 are integrated. As shown in FIG. 27, the wireless communication interface 1333 may include multiple BB processors 1334 and multiple RF circuits 1335. Although FIG. 27 shows an example in which the wireless communication interface 1333 includes multiple BB processors 1334 and multiple RF circuits 1335, the wireless communication interface 1333 may include a single BB processor 1334 or a single RF circuit 1335.

In addition to the cellular communication scheme, the wireless communication interface 1333 may support other types of wireless communication schemes, such as a short distance wireless communication scheme, a near field communication scheme and a wireless LAN scheme. In this case, for each type of wireless communication scheme, the wireless communication interface 1333 may include the BB processor 1334 and the RF circuit 1335.

Each of the antenna switches 1336 switches a connection destination of the antenna 1337 between multiple circuits (such as circuits for different wireless communication schemes) included in the wireless communication interface 1333.

Each of the antennas 1337 includes a single or multiple antenna elements (such as multiple antenna elements included in the MIMO antenna), and is used for the wireless communication interface 1333 to transmit and receive a wireless signal. As shown in FIG. 27, the automobile navigation device 1320 may include multiple antennas 1337. Although FIG. 27 shows an example in which the automobile navigation device 1320 includes multiple antennas 1337, the automobile navigation device 1320 may include a single antenna 1337.

In addition, the automobile navigation device 1320 may include the antenna 1337 for each type of wireless communication scheme. In this case, the antenna switch 1336 may be omitted from the configuration of the automobile navigation device 1320.

The battery 1338 supplies power for blocks in the automobile navigation device 1320 shown in FIG. 27 via a feeder which is indicated partially as a dashed line in the figure. The battery 1338 accumulates power provided by the vehicle.

In the automobile navigation device 1320 shown in FIG. 27, the processing circuit 610 described with reference to FIG. 21 and the acquiring unit 611 and the extracting unit 612 in the processing circuit 610 may be implemented by the processor 1321, and the communication unit 630 described with reference to FIG. 21 may be implemented by the wireless communication interface 1333. At least a part of the functions may be implemented by the processor 1321. For example, the processor 1321 may perform the measurement report function and the relay communication function by executing instructions stored in the memory 1322.

The technology of the present disclosure may be implemented as a vehicle-mounted system (or a vehicle) 1340 including one or more of the automobile navigation device 1320, the vehicle network 1341 and a vehicle module 1342. The vehicle module 1342 generates vehicle data (such as a vehicle speed, an engine speed and fault information), and outputs the generated data to the vehicle network 1341.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof.

The invention claimed is:

1. An electronic device in a wireless communication system, comprising:
   one or more processing circuits configured to perform an operation of:
   configuring timing mapping information between a downlink subframe carrying uplink grant signaling and an uplink subframe carrying uplink transmission comprising Physical Uplink Shared Channel (PUSCH) transmission performed on an unlicensed channel by a user equipment in the wireless communication system scheduled by the uplink grant signaling;
   generating configuration information on a channel detection type of a channel detection process performed by the user equipment before uplink transmission comprising PUSCH transmission on the unlicensed channel;
   setting one of a plurality of unlicensed carriers on the unlicensed channel to be a primary channel, and setting the other unlicensed carriers to be secondary channels;
   configuring the channel detection type for the secondary channels to be a first channel detection process; and
   for the primary channel,
   configuring the channel detection type to be a first channel detection process when the uplink subframe carrying uplink transmission comprising the PUSCH transmission falls within Maximum Channel Occupancy Time (MCOT) after channel detection of a base station side in the wireless communication system is successful; and
   configuring the channel detection type to be a second channel detection process when the uplink subframe carrying the PUSCH transmission falls beyond the MCOT, wherein a contention window size (CWS) associated with the second channel detection process is adjusted based on a success rate of one or more PUSCH transmissions occurring in one or more prior subframes.

2. The electronic device according to claim 1, wherein the processing circuits are further configured to add the timing mapping information to physical layer signaling or Media Access Control (MAC) layer signaling to notify the user equipment.

3. The electronic device according to claim 1, wherein, when configuring the timing mapping information, the processing circuits map one downlink subframe carrying one uplink grant signaling to a plurality of uplink subframes carrying uplink transmission comprising PUSCH transmission scheduled by the one uplink grant signaling.

4. The electronic device according to claim 1, wherein, the downlink subframe carries a plurality of uplink grant signaling, and the processing circuits are further configured to perform an operation of:
configuring each piece of timing mapping information between the downlink subframe carrying each of the plurality of uplink grant signaling and one uplink subframe carrying uplink transmission comprising PUSCH transmission scheduled by each of the plurality of uplink grant signaling.

5. The electronic device according to claim 1, wherein the processing circuits are further configured to perform operations of:
setting one uplink grant signaling to be capable of scheduling uplink transmission comprising PUSCH transmission carried by all uplink subframes before a next downlink subframe carrying a next uplink grant signaling; and
configuring actual timing mapping information between a downlink subframe carrying the one uplink grant signaling and an uplink subframe actually carrying uplink transmission comprising PUSCH transmission scheduled by the one uplink grant signaling.

6. The electronic device according to claim 1, wherein the processing circuits generate subframe boundary information as the configuration information, the subframe boundary information indicating a last subframe which falls within Maximum Channel Occupancy Time (MCOT) after the channel detection of the base station side in the wireless communication system is successful.

7. The electronic device according to claim 1, wherein the first channel detection process is an energy detection process excluding random backoff, and
the second channel detection process is an energy detection process comprising random backoff and a variable contention window size.

8. The electronic device according to claim 1, wherein the processing circuits are further configured to perform operations of:
configuring a channel detection parameter for unlicensed carriers on the unlicensed channel; and
adding the configured channel detection parameter to the physical layer signaling or the Media Access Control (MAC) layer signaling to notify the user equipment.

9. An electronic device in a wireless communication system, comprising:
one or more processing circuits configured to perform operations of:
acquiring downlink signaling from a base station in the wireless communication system;
extracting, from the downlink signaling, timing mapping information between a downlink subframe carrying uplink grant signaling and an uplink subframe carrying uplink transmission comprising Physical Uplink Shared Channel (PUSCH) transmission performed on an unlicensed channel scheduled by the uplink grant signaling;
extracting, from the downlink signaling, configuration information on a channel detection type of a channel detection process to be performed before uplink transmission comprising PUSCH transmission on the unlicensed channel;
extracting, from the downlink signaling, information on which one of a plurality of unlicensed carriers on the unlicensed channel is a primary channel, and which of the unlicensed carriers are secondary channels;
configuring the channel detection type for the secondary channels to be a first channel detection process; and
for the primary channel,
configuring the channel detection type to be a first channel detection process when the uplink subframe carrying uplink transmission comprising the PUSCH transmission falls within Maximum Channel Occupancy Time (MCOT) after channel detection of a base station side in the wireless communication system is successful; and
configuring the channel detection type to be a second channel detection process when the uplink subframe carrying the PUSCH transmission falls beyond the MCOT, wherein a contention window size (CWS) associated with the second channel detection process is adjusted based on a success rate of one or more PUSCH transmissions occurring in one or more prior subframes.

10. The electronic device according to claim 9, wherein, when performing the operations, the processing circuits are configured to:
acquire one uplink grant signaling; and
extract, from the one uplink grant signaling, timing mapping information between one downlink subframe carrying the one uplink grant signaling and a plurality of uplink subframes carrying uplink transmission comprising PUSCH transmission scheduled by the one uplink grant signaling.

11. The electronic device according to claim 9, wherein, when performing the operations, the processing circuits are configured to:
acquire a plurality of uplink grant signaling carried by a same downlink subframe; and
extract, from each of the plurality of uplink grant signaling, each piece of timing mapping information between the same downlink subframe and one uplink subframe carrying uplink transmission comprising PUSCH transmission scheduled by each of the plurality of uplink grant signaling.

12. The electronic device according to claim 9, wherein the processing circuits determine one uplink grant signaling to be capable of scheduling PUSCH transmission carried by all uplink subframes before a next downlink subframe carrying a next uplink grant signaling, and extract, from downlink signaling, actual timing mapping information between a downlink subframe carrying the one uplink grant signaling and an uplink subframe actually carrying uplink transmission comprising PUSCH transmission scheduled by the one uplink grant signaling, as the timing mapping information.

13. The electronic device according to claim 9, wherein the processing circuits are further configured to perform an operation of:

generating, based on the timing mapping information, an instruction for performing uplink transmission comprising PUSCH on the unlicensed channel.

14. The electronic device according to claim 9, wherein the processing circuits acquire subframe boundary information as the configuration information, the subframe boundary information indicating a last subframe which falls within Maximum Channel Occupancy Time (MCOT) after channel detection of a base station side in the wireless communication system is successful.

15. The electronic device according to claim 9, wherein the processing circuits are further configured to perform operations of:
   generating, based on the configuration information, an instruction for performing a first channel detection process or a second channel detection process before performing uplink transmission comprising PUSCH transmission on the unlicensed channel,
   wherein the first channel detection process is an energy detection process excluding random backoff, and the second channel detection process is an energy detection process comprising random backoff and a variable contention window size.

16. The electronic device according to claim 9, wherein the processing circuits are further configured to perform operations of:
   extracting a channel detection parameter from the downlink signaling; and
   configuring, based on the extracted channel detection parameter, a channel detection parameter for unlicensed carriers on the unlicensed channel.

17. A method for performing wireless communication in a wireless communication system, comprising:
   configuring timing mapping information between a downlink subframe carrying uplink grant signaling and an uplink subframe carrying uplink transmission comprising Physical Uplink Shared Channel (PUSCH) transmission performed on an unlicensed channel by a user equipment in the wireless communication system scheduled by the uplink grant signaling;
   notifying the user equipment of the timing mapping information;
   generating configuration information on a channel detection type of a channel detection process performed by the user equipment before uplink transmission comprising PUSCH transmission on the unlicensed channel;
   setting one of a plurality of unlicensed carriers on the unlicensed channel to be a primary channel, and setting the other unlicensed carriers to be secondary channels;
   configuring the channel detection type for the secondary channels to be a first channel detection process; and
   for the primary channel,
   configuring the channel detection type to be a first channel detection process when the uplink subframe carrying uplink transmission comprising the PUSCH transmission falls within Maximum Channel Occupancy Time (MCOT) after channel detection of a base station side in the wireless communication system is successful; and
   configuring the channel detection type to be a second channel detection process when the uplink subframe carrying the PUSCH transmission falls beyond the MCOT, wherein a contention window size (CWS) associated with the second channel detection process is adjusted based on a success rate of one or more PUSCH transmissions occurring in one or more prior subframes.

18. A method for performing wireless communication in a wireless communication system, comprising:
   acquiring downlink signaling from a base station in the wireless communication system;
   extracting, from the downlink signaling, timing mapping information between a downlink subframe carrying uplink grant signaling and an uplink subframe carrying uplink transmission comprising Physical Uplink Shared Channel (PUSCH) transmission performed on an unlicensed channel scheduled by the uplink grant signaling;
   extracting, from the downlink signaling, information on a channel detection type of a channel detection process to be performed by the one or more processing circuits before uplink transmission comprising PUSCH transmission on the unlicensed channel;
   extracting, from the downlink signaling, information on which one of a plurality of unlicensed carriers on the unlicensed channel is a primary channel, and which of the unlicensed carriers are secondary channels;
   configuring the channel detection type for the secondary channels to be a first channel detection process; and
   for the primary channel,
   configuring the channel detection type to be a first channel detection process when the uplink subframe carrying uplink transmission comprising the PUSCH transmission falls within Maximum Channel Occupancy Time (MCOT) after channel detection of a base station side in the wireless communication system is successful; and
   configuring the channel detection type to be a second channel detection process when the uplink subframe carrying the PUSCH transmission falls beyond the MCOT, wherein a contention window size (CWS) associated with the second channel detection process is adjusted based on a success rate of one or more PUSCH transmissions occurring in one or more prior subframes.

* * * * *